US012762721B2

(12) United States Patent
Maschmeyer et al.

(10) Patent No.: US 12,762,721 B2
(45) Date of Patent: Oct. 13, 2026

(54) SYSTEMS AND METHODS FOR GENERATING AUGMENTED REALITY SCENES

(71) Applicant: Shopify Inc., Ottawa (CA)

(72) Inventors: Russ Maschmeyer, Berkeley, CA (US); Eric Andrew Florenzano, San Francisco, CA (US); Brennan Letkeman, Calgary (CA); Diego Macario Bello, Montreal (CA); Daniel Beauchamp, Toronto (CA)

(73) Assignee: Shopify Inc., Ottawa (CA)

( * ) Notice: Subject to any disclaimer, the term of this patent is extended or adjusted under 35 U.S.C. 154(b) by 616 days.

(21) Appl. No.: 17/956,903

(22) Filed: Sep. 30, 2022

(65) Prior Publication Data

US 2024/0029279 A1 Jan. 25, 2024

Related U.S. Application Data

(60) Provisional application No. 63/391,868, filed on Jul. 25, 2022.

(51) Int. Cl.
*G06T 7/40* (2017.01)
*G06T 7/60* (2017.01)

(52) U.S. Cl.
CPC .................. *G06T 7/40* (2013.01); *G06T 7/60* (2013.01); *G06T 2207/10016* (2013.01)

(58) Field of Classification Search
CPC ... G06T 7/40; G06T 7/60; G06T 2207/10016; G06T 2207/10028; G06T 5/77
See application file for complete search history.

(56) References Cited

U.S. PATENT DOCUMENTS

2016/0055268 A1* 2/2016 Bell ........................ G06T 17/00 703/1
2020/0143557 A1* 5/2020 Choi ......................... G06T 7/62
2020/0349351 A1* 11/2020 Brook .................... G06V 20/20
2024/0062345 A1* 2/2024 Kulshreshtha ............ G06T 7/60

* cited by examiner

*Primary Examiner* — Chan S Park
*Assistant Examiner* — Daniel C Chang
(74) *Attorney, Agent, or Firm* — Rowand LLP

(57) ABSTRACT

A computer-implemented is disclosed. The method includes: obtaining three-dimensional geometric scan data and first texture data for a defined space, the defined space defined by interior surfaces including at least one wall; detecting an object occluding a first one of the interior surfaces of the defined space based on the three-dimensional geometric scan data; in response to detecting the object: identifying a corresponding portion of the first interior surface occluded by the detected object; and estimating texture data for the corresponding portion of the first interior surface based on the first texture data for the defined space, and outputting texture data for the interior surfaces based on the first texture data for the defined space and the estimated texture data for the corresponding portion of the first interior surface.

20 Claims, 12 Drawing Sheets

114

SYSTEMS AND METHODS FOR GENERATING AUGMENTED REALITY SCENES

CROSS-REFERENCE TO RELATED APPLICATION

The present application claims the benefit of priority to U.S. Provisional Patent Application No. 63/391,868 filed on Jul. 25, 2022, the contents of which are incorporated herein by reference.

TECHNICAL FIELD

The present disclosure relates to three-dimensional modeling and, in particular, to systems and methods for generating 3D augmented reality scenes.

BACKGROUND

Augmented reality (AR) is used to enhance a real-world environment with computer-generated information. In AR, virtual information is overlaid on a view of a real-world space. The overlaid information is typically constructive, i.e., additive to the natural environment.

BRIEF DESCRIPTION OF THE DRAWINGS

Embodiments will be described, by way of example only, with reference to the accompanying figures wherein.

Like reference numerals are used in the drawings to denote like elements and features.

DETAILED DESCRIPTION OF EMBODIMENTS

Figure 1:
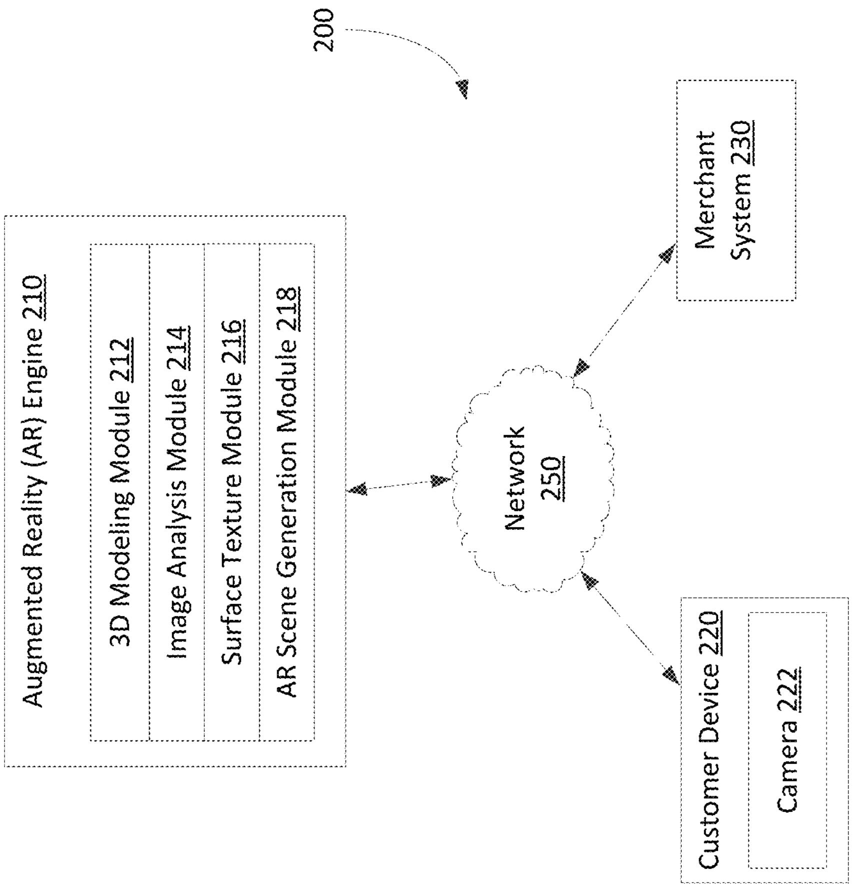
FIG. 1 illustrates an example system for generating 3D models of interior spaces.

In an aspect, the present application discloses a computer-implemented method. The method includes: obtaining three-dimensional geometric scan data and first texture data for a defined space, the defined space defined by interior surfaces including at least one wall; detecting an object occluding a first one of the interior surfaces of the defined space based on the three-dimensional geometric scan data; in response to detecting the object: identifying a corresponding portion of the first interior surface occluded by the detected object; and estimating texture data for the corresponding portion of the first interior surface based on the first texture data for the defined space, and outputting texture data for the interior surfaces based on the first texture data for the defined space and the estimated texture data for the corresponding portion of the first interior surface.

In some implementations, the method may further include outputting a model of the defined space, the model including the texture data for the interior surfaces.

In some implementations, outputting the model of the defined space may include presenting, in a display device, display data representing the texture data for the interior surfaces.

In some implementations, obtaining the three-dimensional geometric scan data and the first texture data may include obtaining real-time video data depicting the defined space and the display data may be generated based on the real-time video data.

In some implementations, the defined space may be an interior space.

In some implementations, the interior space may be a room.

In some implementations, obtaining the three-dimensional geometric scan data and the first texture data for the defined space may include obtaining at least one of camera data or LiDAR scanner data.

In some implementations, identifying the corresponding portion of the first interior surface may include determining a three-dimensional occlusion area associated with the detected object.

In some implementations, the three-dimensional occlusion area may include a three-dimensional bounding box encompassing a position of the detected object.

In some implementations, the three-dimensional bounding box may be represented using geometrical coordinates associated with boundaries of the three-dimensional bounding box.

In some implementations, estimating the texture data for the corresponding portion of the first interior surface may include: obtaining second texture data for portions of the first interior surface that are not occluded by the detected object; and estimating the texture data for the corresponding portion using an inpainting technique based on the second texture data.

In some implementations, estimating the texture data for the corresponding portion may include performing pattern recognition for identifying primary patterns associated with the second texture data.

In some implementations, detecting the object may include determining that the object is positioned in spaced relation to the occluded interior surface.

In some implementations, detecting the object may include performing object recognition based on the three-dimensional geometric scan data using a trained machine learning model.

In another aspect, the present application discloses a computing system. The computing system includes a processor and a memory storing computer-executable instructions that, when executed, configure the processor to: obtain three-dimensional geometric scan data and first texture data for a defined space, the defined space defined by interior surfaces including at least one wall; detect an object occluding a first one of the interior surfaces of the defined space based on the three-dimensional geometric scan data; in response to detecting the object: identify a corresponding portion of the first interior surface occluded by the detected object; and estimate texture data for the corresponding portion of the first interior surface based on the first texture data for the defined space, and output texture data for the interior surfaces based on the first texture data for the defined space and the estimated texture data for the corresponding portion of the first interior surface.

In another aspect, the present application discloses a non-transitory, computer-readable medium storing computer-executable instructions that, when executed by a processor, configure the processor to carry out at least some of the operations of a method described herein.

Other example embodiments of the present disclosure will be apparent to those of ordinary skill in the art from a review of the following detailed descriptions in conjunction with the drawings.

In the present application, the term "and/or" is intended to cover all possible combinations and sub-combinations of the listed elements, including any one of the listed elements alone, any sub-combination, or all of the elements, and without necessarily excluding additional elements.

In the present application, the phrase "at least one of . . . and . . . " is intended to cover any one or more of the listed elements, including any one of the listed elements alone, any sub-combination, or all of the elements, without necessarily excluding any additional elements, and without necessarily requiring all of the elements.

In the present application, the term "product data" refers generally to data associated with products that are offered for sale on an e-commerce platform. The product data for a product may include, without limitation, product specification, product category, manufacturer information, pricing details, stock availability, inventory location(s), expected delivery time, shipping rates, and tax and tariff information. While some product data may include static information (e.g., manufacturer name, product dimensions, etc.), other product data may be modified by a merchant on the e-commerce platform. For example, the offer price of a product may be varied by the merchant at any time. In particular, the merchant may set the product's offer price to a specific value and update said offer price as desired. Once an order is placed for the product at a certain price by a customer, the merchant commits to pricing; that is, the product price may not be changed for the placed order. Product data that a merchant may control (e.g., change, update, etc.) will be referred to as variable product data. More specifically, variable product data refers to product data that may be changed automatically or at the discretion of the merchant offering the product.

In the present application, the term "e-commerce platform" refers broadly to a computerized system (or service, platform, etc.) that facilitates commercial transactions, namely buying and selling activities over a computer network (e.g., Internet). An e-commerce platform may, for example, be a free-standing online store, a social network, a social media platform, and the like. Customers can initiate transactions, and any associated payment requests, via an e-commerce platform, and the e-commerce platform may be equipped with transaction/payment processing components or delegate such processing activities to one or more third-party services. An e-commerce platform may be extendible by connecting one or more additional sales channels representing platforms where products can be sold. In particular, the sales channels may themselves be e-commerce platforms, such as Facebook Shops™, Amazon™, etc.

3D Modeling of Real-World Spaces

A 3D model of a real-world space is a digital representation of the physical features of the space. Users can view, edit, manipulate, and otherwise interact with 3D models of a space. For example, 3D models of interior spaces, such as rooms, hallways, etc., may allow users to experience the premises without actually having to be physically present in the space. More generally, physical spaces can be transformed into 3D models, or "digital twins", that accurately model the spaces. Techniques for generating 3D models include, among others, photogrammetry (i.e., constructing models based on analysis of photographic images), 3D scanning (i.e., extrapolating shapes of subjects based on 3D scan data), and 3D modeling. Advantageously, digitizing a real-world space can remove physical limitations associated with experiencing or interacting with the space. For example, by creating a digital twin of a real-world space, geographical constraints on interacting with the space can be removed, allowing users to immerse themselves in the space from anywhere around the world.

Augmented reality technologies are employed to support extensions of 3D modeling of physical spaces. An AR scene comprises a view of a real-world environment that is augmented with virtual, computer-generated information. AR-enabled computing devices, such as smartphones and head-mounted displays, can be used to view and interact with 3D AR scenes. 3D models of spaces and objects can be visualized in AR. For example, a 3D model of a product (e.g., furniture) can be visualized in a specific real-world space using AR. Customers can view virtual products within the customer's surrounding space, such as a living room, so that the look and size of the products in the space can be appreciated. As another example, an AR scene may include an image of a real-world object overlaid on a virtual 3D model of a space (e.g., a computer-generated scenery). Customers can visualize physical products in a virtual setting that is different from a real-world environment surrounding the products.

In certain contexts, it is desirable to "mask" part of the real-world environment in an AR scene. Rather than adding information to a real-world scene, "masking" involves rendering certain information in a real-world scene, such as physical objects, non-visible using AR. Specifically, real-world objects from a physical space that are represented in an AR scene of the space may be removed (or redacted) from the scene. Such masking allows for visualization of a modified AR scene of the physical space without actually altering the space. For example, an AR scene depicting a room may be modified to render certain objects of the room non-visible in the modified scene, without having to physically remove the corresponding real-world objects from the room. Using AR, a scene of a furnished room may be modified to remove representations of certain furniture, effectively "resetting" all or parts of the room in the modified scene. In particular, a modified AR scene that "resets" a room represents a digital twin of the room prior to any furnishing. Modifying AR scenes in this way is useful for remodeling and/or re-decorating physical spaces, as well as for visualizing replacement objects.

The present application discloses methods for generating 3D models of a physical space. According to disclosed embodiments, a 3D model of a real-world space may be generated based on (1) processing 3D scan data that includes geometric information (e.g., outline contour information) of the space and objects therein, and (2) determining texture information for the space/objects. The scan data may be generated using cameras and/or LiDAR scanners, and a 3D floor plan of the interior space may be created based on the scan. Texturing the model can be done by sampling the camera data at the time of scanning the interior space. The textured 3D model can be aligned with and overlaid onto the space, such as a real-world room, allowing users to interact with a "reset" version of the space.

A 3D scan of a space may be performed using a camera and LiDAR scanner of, for example, a mobile phone. The 3D scan data includes geometric information, such as outline contour information, and texture data of surfaces and objects in the space. The captured camera/LiDAR scanner data is used to build a 3D model of the space. In at least some embodiments, the system may leverage a third-party application or service for floor plan designs to generate the 3D model. Example applications include magicplan (https://www.magicplan.app/) and Apple's RoomPlan. RoomPlan is an API powered by the ARKit framework that uses camera/LiDAR scanner data to create 3D floor plans and capture key elements of a real-world room such as dimensions, furniture, etc. RoomPlan API outputs a geometric model of a scanned room, but may not provide texture data, i.e., only contour information (and not surface texture data) for the room may be represented in an untextured model. The untextured model is aligned with the real-world room (for example, using ARWorldMap). In particular, detected features of the untextured model can be matched with features of the room for alignment, which then allows for correct texturing of objects. More information about RoomPlan API is provided in "RoomPlan|Apple Developer Documentation", which is incorporated herein by reference in its entirety and can be accessed at https://developer.apple.com/documentation/RoomPlan.

The geometric model is textured based on sampling the camera feed in real-time at the time of scanning the room. That is, texture data associated with the geometric model is determined from sampling camera data depicting the room. This approach can be problematic when there are objects in the room that obscure the camera's line of sight of interior surfaces (i.e., interior walls and floor). An object may, for example, occlude parts of one or more interior surfaces in the camera data for the 3D scan. For example, a sofa that is positioned adjacent to an interior wall occludes at least part of the wall in camera data capturing a scene that includes the sofa and the wall. In such cases of partially or fully occluded interior surfaces, sampling texture data would result in a noisy sampling of occluding object(s) and interior surface textures combined. In order to address this issue, the system redacts (e.g., leaves unfilled, removes, or hides) parts of the texture of interior surfaces of the room and uses inpainting techniques to fill in the redacted texture.

The system first performs object detection based on the camera data during a 3D scanning session of a room. In particular, the system is configured to identify occluding objects that are different from interior surfaces (i.e., walls, floor) of the room. Such objects include objects in the room that the system can distinguish from an interior surface of the room (e.g., objects the system may be configured to identify as being not continuous with, as sticking out from, as being not a part of, etc. an interior surface of the room) and that occlude at least part of the interior surface. The system may identify such objects using, for example, object recognition and depth information associated with scenes.

In response to detecting an occluding object, the system identifies a corresponding portion of an interior surface that is occluded by the object. An occluded portion of an interior surface is a portion that is blocked or covered by a detected object interposed between the camera and the interior surface along the camera's line of sight. The texture data for the room that is obtained based on the 3D scan may not include texture data for an occluded portion of an interior surface. In some embodiments, the system may define "occlusion areas" corresponding to the detected objects and that are not initially assigned texture information. An occlusion area may be a three-dimensional area represented using a bounding box that encompasses a position of the detected object. The system may, in some embodiments, determine bounding box references (i.e., coordinates) associated with the detected objects and use the references in determining which parts of the interior surface texture information to redact. In some embodiments, the bounding box references may be provided by a 3D floor design framework (e.g., RoomPlan API) used to generate the untextured 3D model of the room.

In some embodiments, machine learning may be employed in detecting one or more occluding objects. For example, the system may be configured to perform object recognition based on the camera data using a trained machine learning model. The trained ML models may, for example, be object detection models associated with a defined set of objects (e.g., indoor furniture).

The system then determines texture data for the occluded portions of the interior surfaces. The texture data may, for example, be an estimate or approximation of the "true" texture of the real-world interior surface. In some embodiments, pattern detection may be combined with geometric awareness of the scene for purposes of inpainting the redacted textures. For example, surface texture of background walls and floors may be analyzed to identify any prevailing pattern(s), and the pattern analysis may be combined with scene information (e.g., dimensions, positions, and orientations of objects, walls, floors, etc.) as detected during the 3D scanning to determine how each of the occlusion zones should be filled. An occlusion zone may have multiple associated surface textures corresponding to different perspectives of the detected object (e.g., a different texture for each perspective). In some embodiments, depth information may be used to identify/extract textures of the background surfaces. For example, textures of objects such as picture frames, TVs, or other decorative ornaments affixed to wall surfaces may be excluded by setting the extraction to occur only from surfaces at the same depth as the wall.

The textured 3D model of the room that is output by the system may represent all of the wall surfaces of the real-world room with all or selected ones of the objects removed from the 3D model. The textured 3D model can be overlaid onto the real space using AR and edited digitally. For example, in the commerce context, customers can view different furniture options in the textured 3D model of the real-world room using an AR device. The textured 3D model may be output by, for example, presenting, in a display device, display data representing the texture data for the interior surfaces.

Reference is first made to FIG. 1, which illustrates, in block diagram form, an example system 200 for generating 3D models of real-world spaces. As shown in FIG. 1, the system 200 may include an AR engine 210, customer devices 220, merchant systems 230, and a network 250 connecting one or more of the components of system 200.

The customer devices 220 and the merchant system 230 communicate via the network 250. In at least some embodiments, each of the customer devices 220 and the merchant system 230 may be a computing device. The customer devices 220 and the merchant system 230 may take a variety of forms including, for example, a mobile communication device such as a smartphone, a tablet computer, a wearable computer (such as a head-mounted display or smartwatch), a laptop or desktop computer, or a computing device of another type.

The customer device 220 is a computing device associated with a customer. For example, a customer device 220 may be associated with an individual customer of an e-commerce platform. Customer devices 220 can be used to, for example, access product information, order products, manage customer accounts, and otherwise facilitate commercial activities of customers. As shown in FIG. 1, a customer device 220 includes certain sensors, such as a camera 222, that can be used to collect sensor data. The sensors of customer device 220 (e.g., cameras, LiDAR scanners, etc.) may be used to capture data that is used for generating AR scenes of real-world spaces associated with the customer and/or customer device 220. For example, customers can capture live image or video data depicting their surrounding space using their customer device 220, and the captured image/video data may be overlaid with computer-generated information to generate an AR scene of the space. Using their customer device 220, a customer can view, edit, manipulate, and otherwise interact with AR scenes featuring products of interest.

A merchant system 230 is a computing system associated with a merchant of products. Using their merchant system 230, a merchant can provide product information, manage storefronts, and access various merchant-facing functionalities of an e-commerce platform.

An AR engine 210 is provided in the system 200. The AR engine 210 may be a software-implemented component containing processor-executable instructions that, when executed by one or more processors, cause a computing system to carry out some of the processes and functions described herein. In some embodiments, the AR engine 210 may be provided as a stand-alone service. In particular, a computing system may engage the AR engine 210 as a service that facilitates generation of 3D models of real-world subjects.

The AR engine 210 supports the generation of AR content, such as AR scenes of real-world spaces. The AR engine 210 is communicably connected to one or more customer devices 220. Sensor data from customer devices 220 may be used in generating AR scenes. For example, customer devices 220 may transmit captured camera and LiDAR scanner data directly to the AR engine 210, or camera/LiDAR scanner data from customer devices 220 may be received at the AR engine 210 via an intermediary computing system.

In accordance with one or more disclosed embodiments, the AR engine 210 may be configured to construct 3D models of real-world spaces and generate AR scenes based on the 3D models. As a particular application, the AR engine 210 may construct a 3D model representing modifications to a real-world space and this 3D model may be used for generating an AR scene. For example, the AR engine 210 may create a 3D model of a real-world room with objects removed and provide the 3D model in an AR scene depicting the room. The resulting AR scene represents a digital twin of the real-world room; users can interact with the AR scene to experience and interact with a version of the room that is different from the real-world room.

As shown in FIG. 1, the AR engine 210 may include a 3D modeling module 212, an image analysis module 214, a surface texture module 216, and an AR scene generation module 218. The modules may comprise software components that are stored in a memory and executed by a processor to support various functions of the AR engine 210.

The 3D modeling module 212 can be configured to perform operations for constructing, editing, storing, and manipulating 3D models of subjects. A subject may be a person, a physical item, or a real-world space. The 3D modeling module 212 may obtain subject information (e.g., image and video data, measured range/depth data, etc.) and generate a virtual 3D representation of the subject based on the obtained information.

The image analysis module 214 can be configured to analyze images stored and/or received by the AR engine 210. The image analysis module 214 receives images, videos, and the like as input, and outputs information regarding the image. Various algorithms may be included in or implemented by the image analysis module 214; non-limiting examples of such algorithms include: object recognition algorithms, image segmentation algorithms; surface, corner, and/or edge detection algorithms; and motion detection algorithms. In particular, the image analysis module 214 can detect objects in images and identify features of the detected objects.

The surface texture module 216 can be configured to determine texture data associated with surfaces. Surface texture indicates the nature of an interpreted surface—a portion of a real-world surface—and may be described using specialized terms, such as lay, waviness, and surface roughness. In particular, surface texture comprises the small, local deviations of a surface from the perfectly flat ideal. For purposes of the present application, the term "surface texture" is used to broadly refer to data describing characteristics and appearance of a solid object's surface(s). The surface texture module 216 can process image or video data to extract surface texture information for surfaces that are detected in the image/video data.

The AR scene generation module 218 can be configured to generate AR scenes by combining real and virtual (i.e., computer-generated) information. For example, the AR scene generation module 218 may obtain a 3D model of a real-world space (e.g., a room, hallway, etc.) and overlay the 3D model onto the real-world space using AR. The AR scene generation module 218 determines how to align the 3D model with the real-world space. AR scenes containing the aligned model can be provided by the AR scene generation module 218, for example, via AR-enabled computing devices (e.g., head-mounted displays).

The AR engine 210, the customer devices 220, and the merchant system 230 may be in geographically disparate locations. Put differently, the customer devices 220 may be remote from one or more of: AR engine 210, and the merchant system 230. As described above, the customer devices 220, the merchant system 230, and the AR engine 210 may be computing systems.

The network 250 is a computer network. In some embodiments, the network 250 may be an internetwork such as may be formed of one or more interconnected computer networks. For example, the network 250 may be or may include an Ethernet network, an asynchronous transfer mode (ATM) network, a wireless network, or the like.

In some example embodiments, the AR engine 210 may be integrated as a component of an e-commerce platform. That is, an e-commerce platform may be configured to implement example embodiments of the AR engine 210. More particularly, the subject matter of the present application, including example methods for constructing 3D models and generating AR scenes disclosed herein, may be employed in the specific context of e-commerce.

Figure 2:
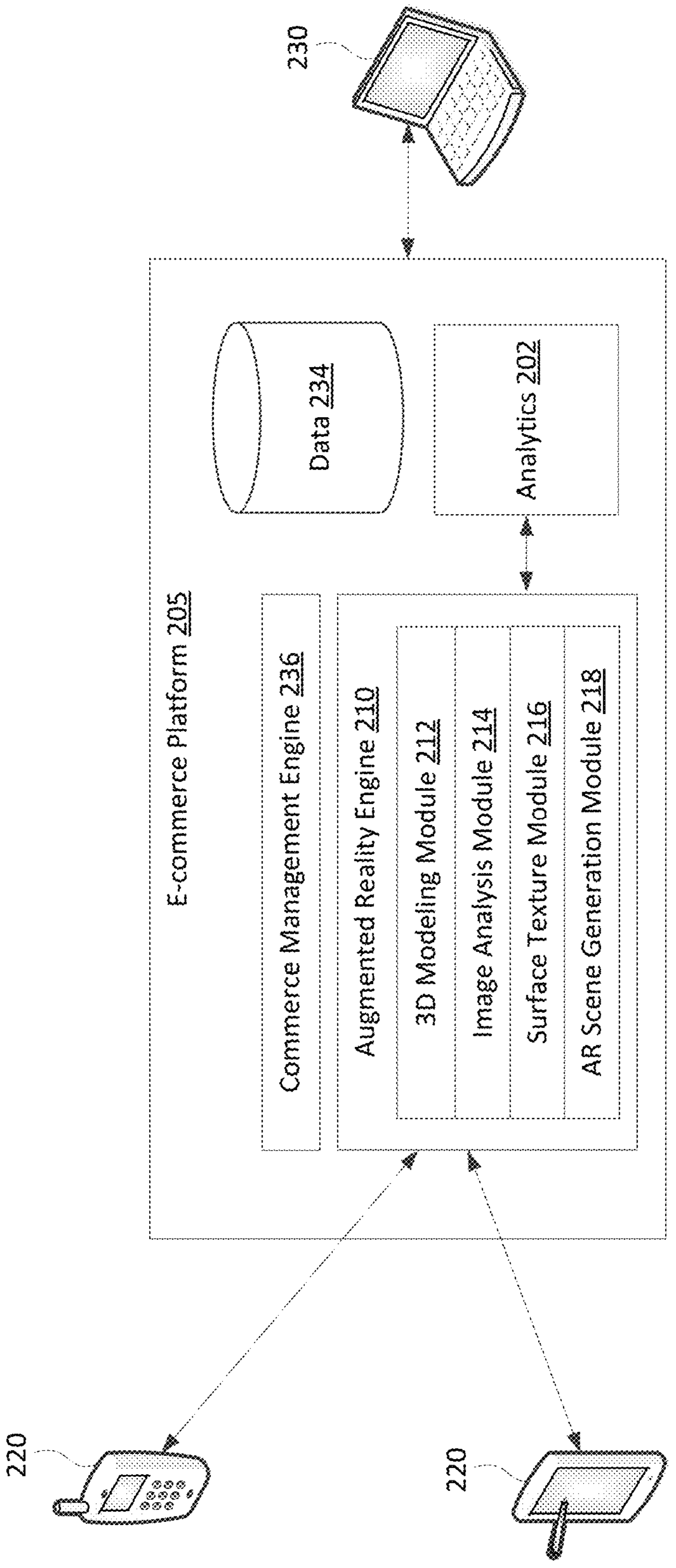
FIG. 2 is a block diagram of an e-commerce platform that is configured for implementing example embodiments of the AR engine of FIG. 1.

Reference is made to FIG. 2 which illustrates an example embodiment of an e-commerce platform 205 that implements an AR engine 210. The customer devices 220 and the merchant system 230 may be communicably connected to the e-commerce platform 205. In at least some embodiments, the customer devices 220 and the merchant system 230 may be associated with accounts of the e-commerce platform 205. Specifically, the customer devices 220 and the merchant system 230 may be associated with individuals that have accounts in connection with the e-commerce platform 205. For example, one or more customer devices 220 and merchant system 230 may be associated with customers (e.g., customers having e-commerce accounts) or merchants having one or more online stores in the e-commerce platform 205. The e-commerce platform 205 may store indications of associations between customer devices/merchant systems and customers or merchants of the e-commerce platform, for example, in the data facility 134.

The e-commerce platform 205 includes a commerce management engine 236, an AR engine 210, a data facility 234, and a data store 202 for analytics. The commerce management engine 236 may be configured to handle various operations in connection with e-commerce accounts that are associated with the e-commerce platform 205. For example, the commerce management engine 236 may be configured to retrieve e-commerce account information for various entities (e.g., merchants, customers, etc.) and historical account data, such as transaction events data, browsing history data, and the like, for selected e-commerce accounts.

The functionality described herein may be used in commerce to provide improved customer or buyer experiences. The e-commerce platform 205 may implement the functionality for any of a variety of different applications, examples of which are described herein. Although the AR engine 210 of FIG. 2 is illustrated as a distinct component of the e-commerce platform 205, this is only an example. An engine could also or instead be provided by another component residing within or external to the e-commerce platform 205. In some embodiments, one or more applications that are associated with the e-commerce platform 205 may provide an engine that implements the functionality described herein to make it available to customers and/or to merchants. Furthermore, in some embodiments, the commerce management engine 236 may provide that engine. However, the location of the AR engine 210 may be implementation specific. In some implementations, the AR engine 210 may be provided at least in part by an e-commerce platform, either as a core function of the e-commerce platform or as an application or service supported by or communicating with the e-commerce platform. Alternatively, the AR engine 210 may be implemented as a standalone service to clients such as a customer device or a merchant device. In addition, at least a portion of such an engine could be implemented in the merchant system and/or in the customer device. For example, a customer device could store and run an engine locally as a software application.

The AR engine 210 is configured to implement at least some of the functionality described herein. Although the embodiments described below may be implemented in association with an e-commerce platform, such as (but not limited to) the e-commerce platform 205, the embodiments described below are not limited to e-commerce platforms.

The data facility 234 may store data collected by the e-commerce platform 205 based on the interaction of merchants and customers with the e-commerce platform 205. For example, merchants provide data through their online sales activity. Examples of merchant data for a merchant include, without limitation, merchant identifying information, product data for products offered for sale, online store settings, geographical regions of sales activity, historical sales data, and inventory locations. Customer data, or data which is based on the interaction of customers and prospective purchasers with the e-commerce platform 205, may also be collected and stored in the data facility 234. Such customer data is obtained on the basis of inputs received via customer devices associated with the customers and/or prospective purchasers. By way of example, historical transaction events data including details of purchase transaction events by customers on the e-commerce platform 205 may be recorded and such transaction events data may be considered customer data. Such transaction events data may indicate product identifiers, date/time of purchase, final sale price, purchaser information (including geographical region of customer), and payment method details, among others. Other data vis-à-vis the use of e-commerce platform 205 by merchants and customers (or prospective purchasers) may be collected and stored in the data facility 234.

The data facility 234 may include customer preference data for customers of the e-commerce platform 205. For example, the data facility 234 may store account information, order history, browsing history, and the like, for each customer having an account associated with the e-commerce platform 205. The data facility 234 may additionally store, for a plurality of e-commerce accounts, wish list data and cart content data for one or more virtual shopping carts.

Figure 3:
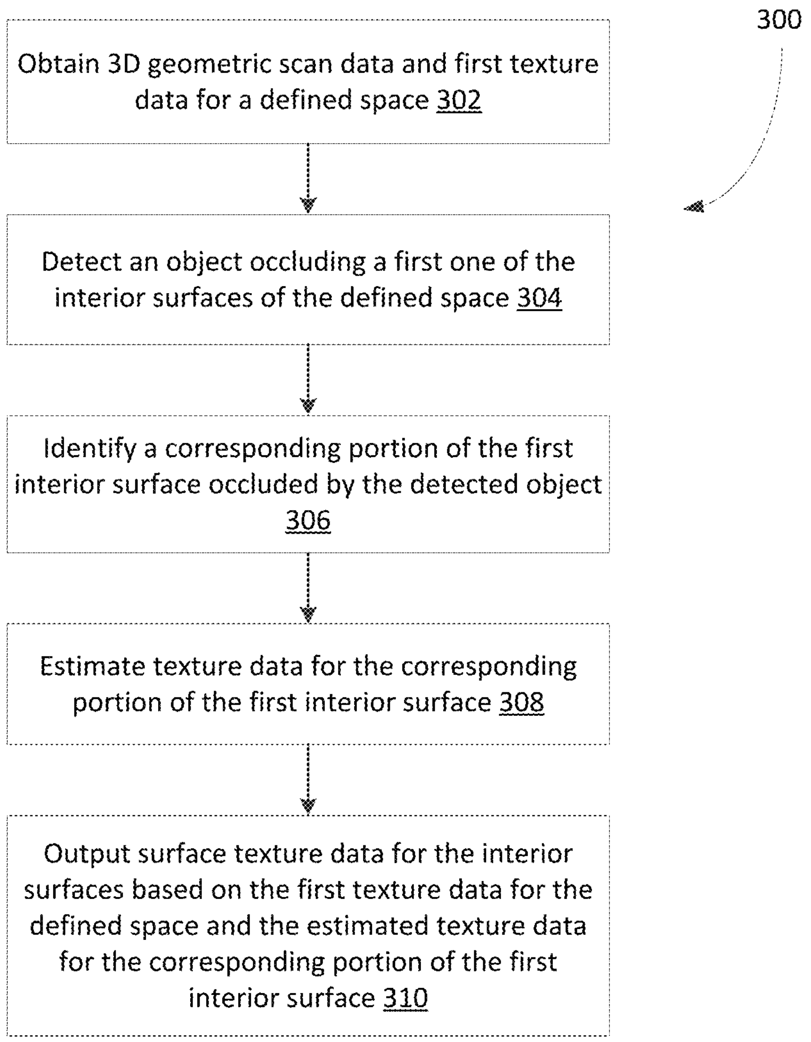
FIG. 3 shows, in flowchart form, an example method for generating a 3D model of a real-world space.

Reference is now made to FIG. 3, which shows, in flowchart form, an example method 300 for generating a 3D model of a real-world space. The method 300 may be performed by a computing system that supports generation of AR content, such as the AR engine 210 of FIG. 1. As detailed above, an AR engine may be a service that is provided within or external to an e-commerce platform. An AR engine may implement the operations of method 300 as part of a process for generating a virtual 3D representation of a modified version of a real-world space.

AR-enabled computing devices may be used to visualize a real-world space. Such devices may additionally allow users to view altered representations of a real-world space. For example, users may desire to view a real-world space with certain visual information (e.g., furniture in a room) removed or redacted from a representation of that space. In accordance with disclosed embodiments of the present disclosure, an AR engine, such as the AR engine 210 of FIG. 1, can construct 3D models representing modified versions of a real-world space.

Figure 7:
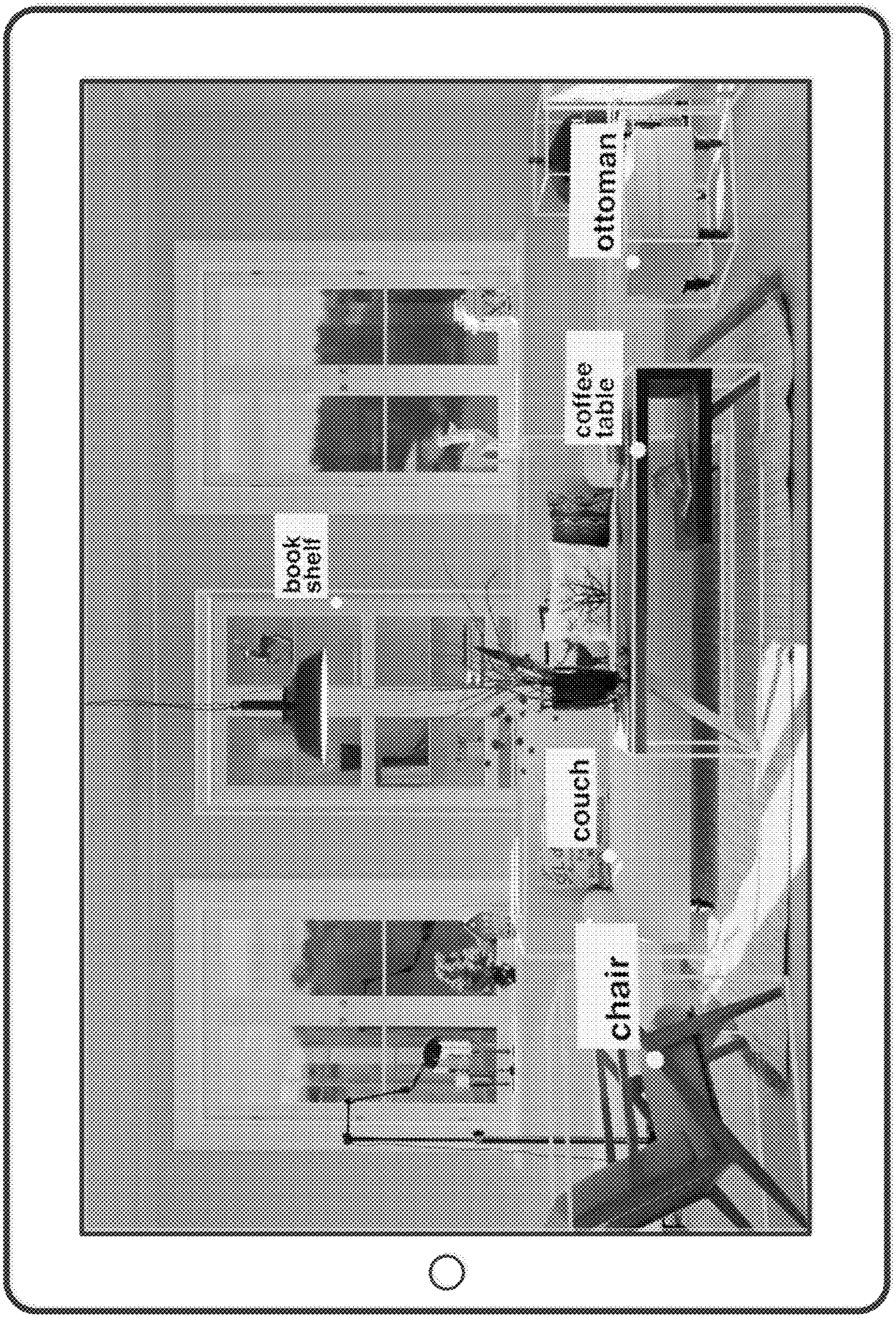
FIG. 7 illustrates an example AR scene displayed on a client device.
Figure 8:
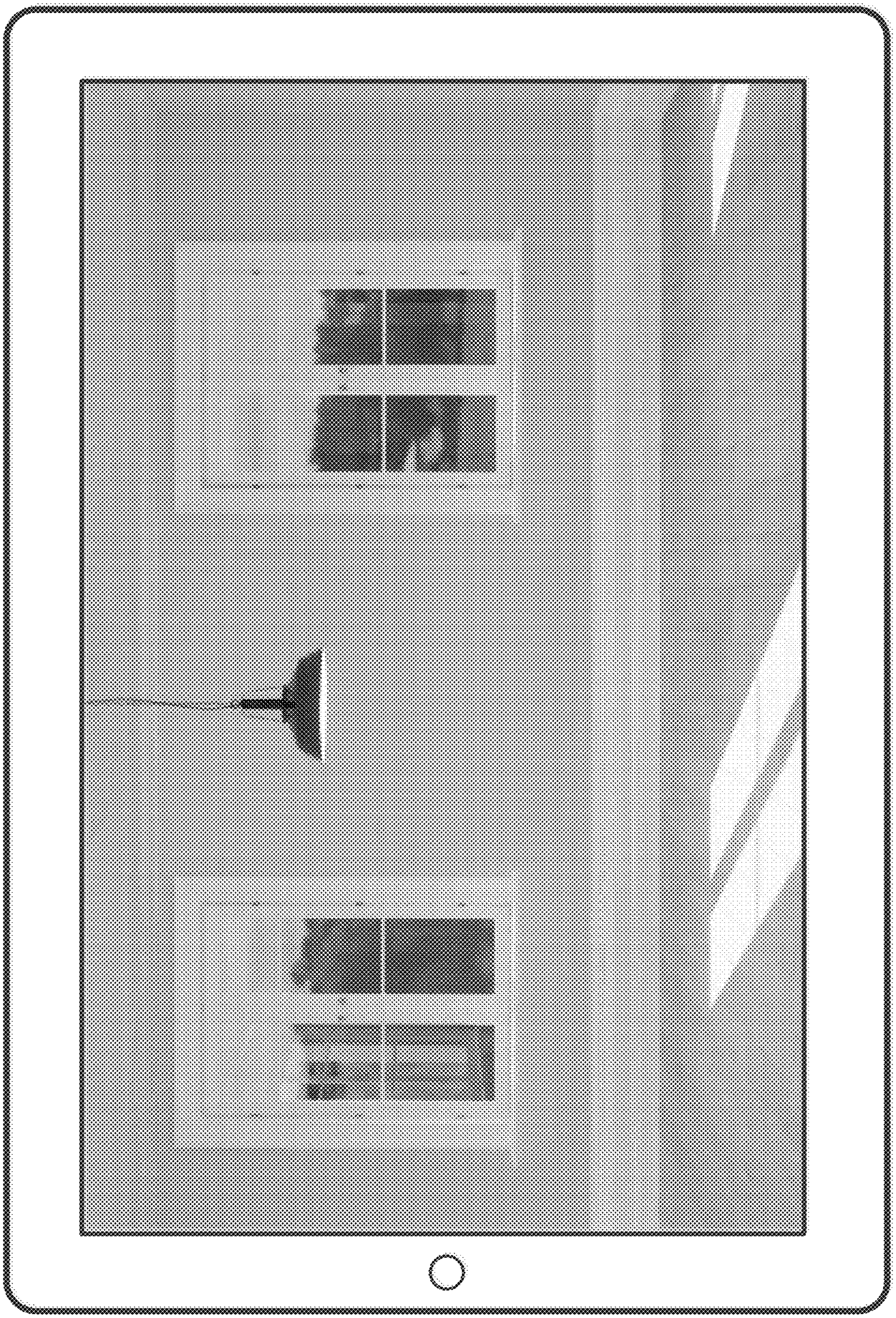
FIG. 8 illustrates an example modified AR scene displayed on a client device.

Using an AR-enabled device, a user may request to view a specific modification of a real-world space. The requested modification may, for example, be a "resetting" of a representation of the real-world space; that is, the user may request to view the real-world space with all or a portion of the objects in the space removed. FIGS. 7 and 8 show example illustrations of a real-world room and how it may be reset to remove objects in the room. The real-world space is defined by a plurality of interior surfaces, including at least one wall. For example, the real-world space may be a space in the interior of a structure (e.g., building), such as a room, hallway, corridor, stairs, a landing, and the like.

The AR engine obtains three-dimensional geometric scan data for the real-world space, in operation 302. In some embodiments, the 3D geometric scan data may comprise at least one of camera data or LiDAR scanner data. The camera data may include image or video data obtained using one or more camera sensors. For example, the camera data may be obtained via a camera associated with the user's computing device, such as a smartphone or tablet computer. Similarly, the LiDAR scanner data may be obtained via a LiDAR scanner associated with the user's computing device. The 3D geometric scan data is obtained during a manual 3D scan performed by a user. The manual scan can be performed so as to capture all or a significant portion of the physical information associated with the real-world space. In some embodiments, the user may be prompted to provide 3D geometric scan data, such as camera and/or LiDAR scanner data, on their device. For example, a message may be provided, via a graphical user interface of an AR application, prompting the user to capture, in real-time, images and/or video depicting physical surroundings of the real-world space.

The 3D scan data provides geometric information about the real-world space such as, for example, outline contour information. Contours of space-defining features and objects may be determined based on the 3D scan data. In some embodiments, the AR engine may leverage an application or service to construct a geometric model of the real-world space using the 3D scan data. The AR engine may provide the 3D scan data as input to a third-party application, service, or API framework (e.g., RoomPlan API) designed to create 3D floor plans of interior spaces. A geometric model, or a 3D floor plan, of the scanned space may be output. The geometric model may indicate key characteristics of the real-world space such as dimensions and types of furniture. Specifically, the output model may include dimensions of components recognized in the real-world space, such as walls or cabinets, as well as the type of furniture detected. In at least some embodiments, the geometric model may not include texture data of surfaces of the real-world space. In particular, the geometric model may be an untextured model that comprises only contour information. The geometric model is aligned with the real-world space. For example, the contour information of the geometric model may be used to identify matches between features (e.g., objects, room-defining features, etc.) in the real-world space and the geometric model. The alignment may comprise a correspondence (or association) between the matching features of the real-world space and the geometric model. The AR engine determines surface texture data for the untextured geometric model of the real-world space, in accordance with embodiments that are described in greater detail below.

The AR engine also obtains first texture data for the real-world space. The first texture data comprises texture information for surfaces of the real-world space. Specifically, the first texture data represents data characterizing surface textures. In at least some embodiments, the first texture data may comprise color information for surfaces of the real-world space. The AR engine may receive, via a user device, image and/or video data depicting the real-world space. The images and video frames of the video may then be analyzed to determine pixel data representing color values of pixels in the images/video frames. That is, the AR engine can sample image and video data to ascertain color information associated with surfaces of the real-world space.

In at least some embodiments, the AR engine may determine mappings between the first texture data and detected surfaces of the real-world space. The AR engine may be configured to detect space-defining features such as interior walls, floors, doors, and the like, by analyzing images and videos depicting the real-world space. In particular, for an image/video frame, the AR engine may determine the portions (i.e., pixels) of the image/video frame that depict a detected surface. The pixels of the images/video frames can be associated with the detected surfaces, and the color information (i.e., first texture data) corresponding to the pixels can be mapped to the detected surfaces. A mapping may comprise an association of a detected surface (e.g., an interior wall) with color information describing color at different points on the detected surface.

In operation 304, the AR engine detects an object occluding a first one of the interior surfaces of the real-world space. An occluding object is an object that blocks or hides at least a portion of an interior surface within a camera's field of view. In images/video frames of a scene, an occluding object represents a foreground object of the scene that occludes one or more background surfaces. For example, an occluding object may be furniture that is positioned adjacent to an interior wall of a room. The furniture occludes at least part of the interior wall in images and/or video frames that depict the interior wall. In at least some embodiments, the occluding object is different from and independent of the occluded interior surface. In particular, the occluding object may be an object that the AR engine determines, or is configured to determine, to be (1) not continuous with, (2) not part of, or (3) disposed in spaced relation to an interior surface of the real-world space. The occluding object may be detected by performing object recognition based on the 3D geometric scan data using a trained machine learning model.

The AR engine detects the occluding object based on the three-dimensional geometric scan data. In particular, the occluding object may be detected in images or video frames depicting the real-world space. The AR engine receives the images and/or video frames via a user device that is used to perform a 3D scan of the real-world space, and performs object detection using the images/video frames. Additionally, or alternatively, the AR engine may use LiDAR scanner data to determine depths of objects and interior surfaces in a scene, and detect occluding objects based on the depth information. For example, the AR engine may supplement object recognition techniques with LiDAR-based depth information to identify objects that are different from an interior surface, i.e., occluding objects.

The image and video data depicting the real-world space may be continuously parsed by the AR engine (e.g., at a rate sufficient to result in a typical frame rate for video). In particular, video frames of a video corresponding to a real-time 3D scan of the real-world space may be analyzed using an object detection model. Based on the analysis, the AR engine may detect an occluding object and an associated first interior surface that is at least partially occluded.

In cases of a partially or fully occluded interior surface, sampling image and video data to ascertain texture (e.g., color) information would result in a noisy sampling of occluding object and interior surface texture combined. To address this issue, the AR engine is configured to redact (e.g., leaves unfilled, removes, or hides) parts of the texture of the occluded interior surface. In particular, the texture associated with an occluded portion of the interior surface is redacted. The redacted texture may then be filled independently of the sampling of image/video frame data to determine surface texture for the entire interior surface.

In response to detecting the occluding object, the AR engine identifies a corresponding portion of the first interior surface that is occluded by the detected object, in operation 306. An occluded portion of an interior surface is a portion that is blocked or hidden by the detected occluding object.

The occluded portion may be identified based on analysis of image and/or video frame data associated with a 3D scan of the real-world space.

Figure 9:
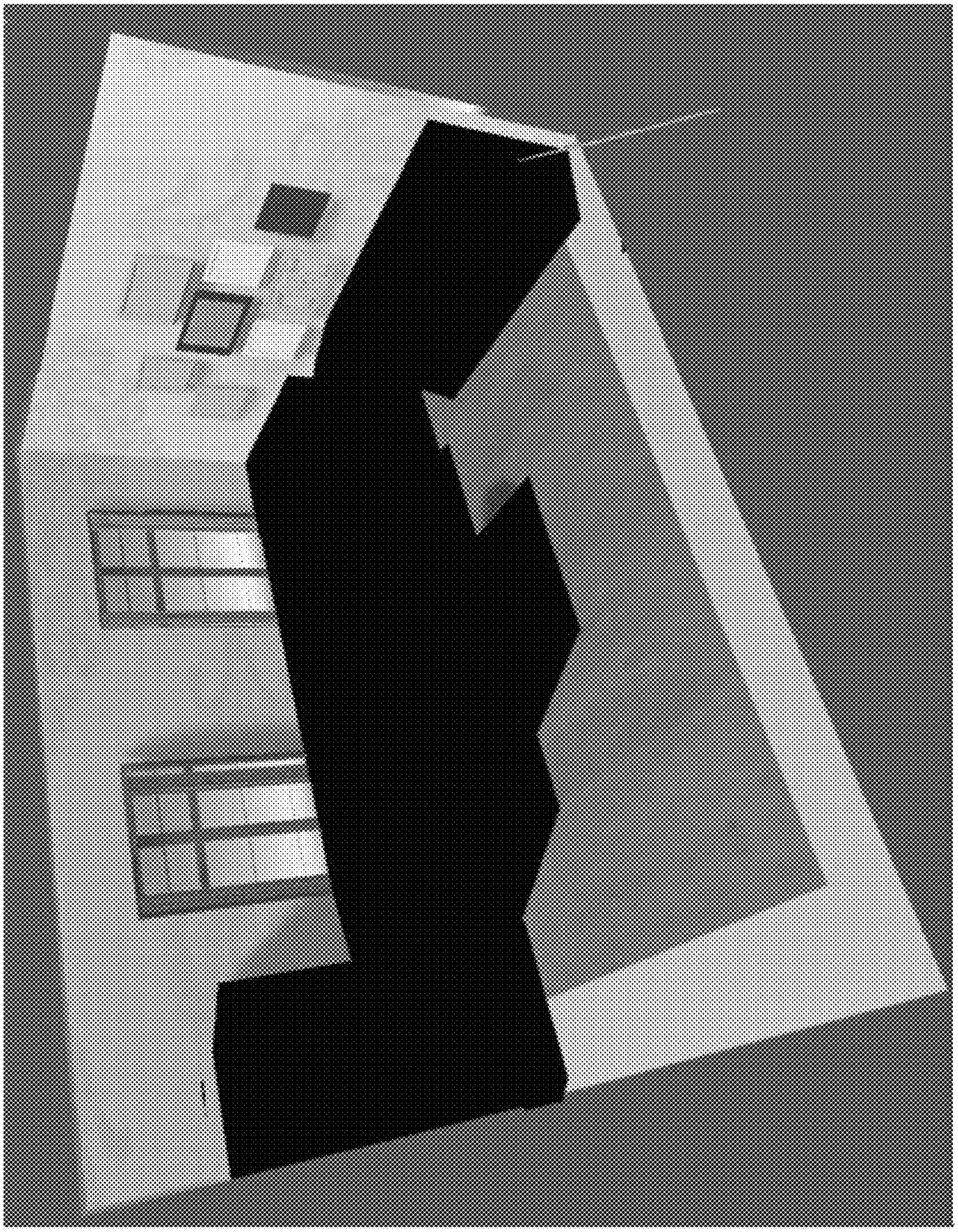
FIG. 9 illustrates an example partial 3D model of an interior space.

In at least some embodiments, the AR engine may define three-dimensional “occlusion areas” corresponding to occluding objects in a real-world space. FIG. 9 illustrates a plurality of example occlusion areas in a room. Each occlusion area corresponds to a respective occluding object. That is, each occlusion area is associated with a detected object that occludes at least a portion of an interior surface of the room. The occlusion areas are not assigned texture data. As shown in FIG. 9, the occlusion areas may be represented as untextured 3D volumes. For example, an occlusion area may be represented as a 3D bounding box that encompasses a position of a corresponding occlusion object. A bounding box may be associated with geometrical coordinates of boundaries of the bounding box.

An occlusion area may be used in identifying the occluded portion of the first interior surface. In particular, the occluded portion may correspond to an overlap between the occlusion area and the first interior surface. The AR engine may obtain bounding box references (i.e., coordinates) and use the references to determine which parts of the texture of the first interior surface to redact. In some embodiments, the bounding box references may be provided by a third-party application, service, or API framework (e.g., RoomPlan API) used to generate the untextured 3D model of the real-world space. For example, a third-party API framework may provide the capabilities of recognizing room features, furniture, appliances, and the like, based on 3D scan data, and output bounding box information associated with the recognized objects and features.

The AR engine determines texture data for the occluded portion of the first interior surface. In particular, the AR engine estimates texture data for the occluded portion. That is, the “true” texture of the occluded portion is estimated or approximated. The texture data is estimated based on the first texture data for the real-world space determined based on the 3D geometric scan. That is, the estimate of the texture for the occluded portion uses texture information previously ascertained through 3D scanning of the real-world space. In at least some embodiments, the AR engine determines second texture data for portions of the first interior surface that are not occluded by the detected object. The second texture data may comprise, for example, texture information for areas surrounding the occluded portion on the first interior surface. The texture data for the occluded portion is estimated using a digital inpainting technique based on the second texture data. In particular, the occluded portion is treated as a missing information in images/video frames depicting the first interior surface, and the images/video frames are processed using inpainting techniques to restore the missing information.

The AR engine may perform pattern recognition for identifying patterns associated with the second texture data. The first texture data and pattern detection may be combined with geometric awareness of the real-world space for purposes of inpainting the redacted texture. For example, surface texture of background walls and floors may be analyzed to identify any prevailing pattern(s), and the pattern analysis may be combined with scene information for the real-world space (e.g., dimensions, positions, and orientations of objects, walls, floors, etc.), as detected during the 3D scanning, to determine how each of the occluded portions should be filled. An occlusion area may have multiple associated surface textures corresponding to different perspectives of the detected occlusion object (e.g., a different texture for each perspective). In some embodiments, depth information may be used to identify/extract textures of the background surfaces. For example, textures of objects such as picture frames, TVs, or other decorative ornaments affixed to wall surfaces may be excluded by setting the extraction to occur only from surfaces at the same depth as the wall.

In operation 310, the AR engine outputs texture data for the interior surfaces of the real-world space. The texture data includes surface texture information for the first interior surface, which is determined based on the first texture data and the estimated texture data for the occluded portion of the first interior surface.

In some embodiments, the AR engine outputs a 3D model of the real-world space. The 3D model is a textured 3D representation of the real-world space. The 3D model includes the texture data for the interior surfaces, including the occluded first interior surface. The AR engine is configured to present, in an AR-enabled computing device, display data representing the texture data for the interior surfaces.

Figure 4:
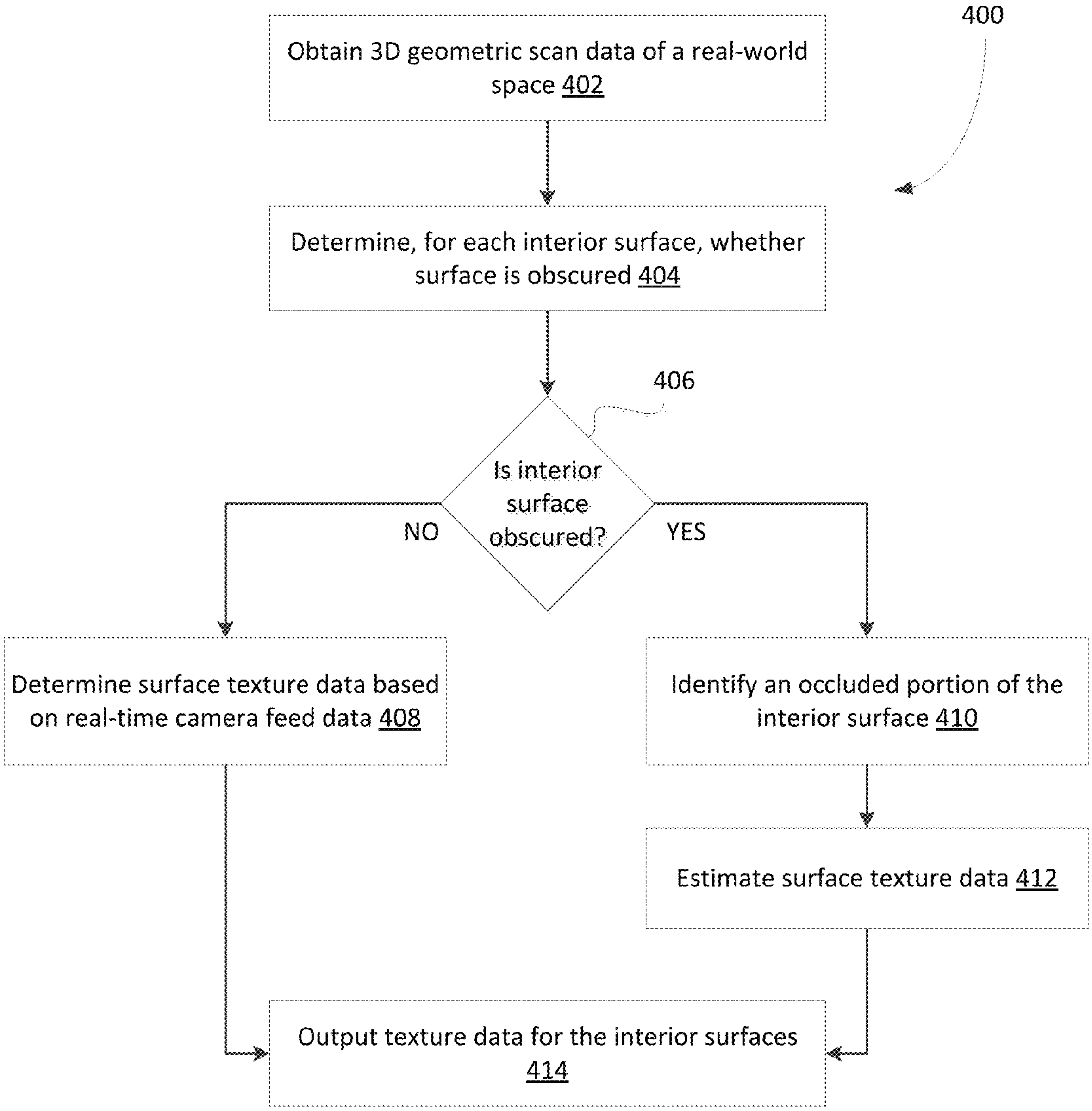
FIG. 4 shows, in flowchart form, an example method for determining surface textures of interior surfaces in a real-world space.

Reference is now made to FIG. 4, which shows, in flowchart form, an example method 400 for determining surface textures of interior surfaces in a real-world space. The method 400 may be performed by a computing system that supports generation of AR content, such as the AR engine 210 of FIG. 1. An AR engine may implement the operations of method 400 as part of a process for generating a virtual 3D representation of a modified version of a real-world space. The operations of method 400 may be performed in addition to, or as alternatives of, one or more operations of method 300.

In operation 402, the AR engine obtains 3D geometric scan data of a real-world space (e.g., a room). In at least some embodiments, the 3D scan data may comprise at least one of camera data (i.e., images and/or video feed) or LiDAR scanner data. The AR engine may receive the 3D scan data from a computing device that is used to perform a scan of the real-world space. For example, a user may perform a 3D scan of an interior space using a camera and/or a LiDAR scanner associated with their mobile computing device (e.g., smartphone, tablet computer, etc.). The scan data may be provided to the AR engine, in real-time, for processing and analysis.

The real-world space may be a space that is defined by one or more interior surfaces such as walls. In operation 404, the AR engine determines, for each interior surface of the real-world space, whether the surface is obscured. In particular, the AR engine may analyze the 3D scan data to determine, for each interior surface, whether there are any occluding objects that occlude at least a portion of the interior surface. Using the image/video frame data, the AR engine performs object detection in the depicted scenes to identify objects that occlude any part of an interior surface.

If an interior surface is determined to be at least partially obscured (operation 406), the AR engine proceeds to identify an occluded portion of the interior surface, in operation 410. The AR engine then estimates surface texture data for the occluded portion, in operation 412. Operations 410 and 412 may be implemented in a similar manner as operations 306 and 308 of method 300, respectively.

If, on the other hand, the interior surface is determined to not be obscured by any object, the surface texture data for the interior surface is determined based on real-time camera feed data (i.e., images or video frames) associated with the 3D scan of the real-world space. That is, the texture information for a non-occluded interior surface may be determined from sampling of image/video frame data to ascertain texture information, such as color, associated with the interior surface.

In operation 414, the AR engine outputs texture data for the interior surfaces of the real-world space. The texture data includes surface texture information for all detected interior surfaces of the real-world space, including occluded and non-occluded surfaces.

Figure 5:
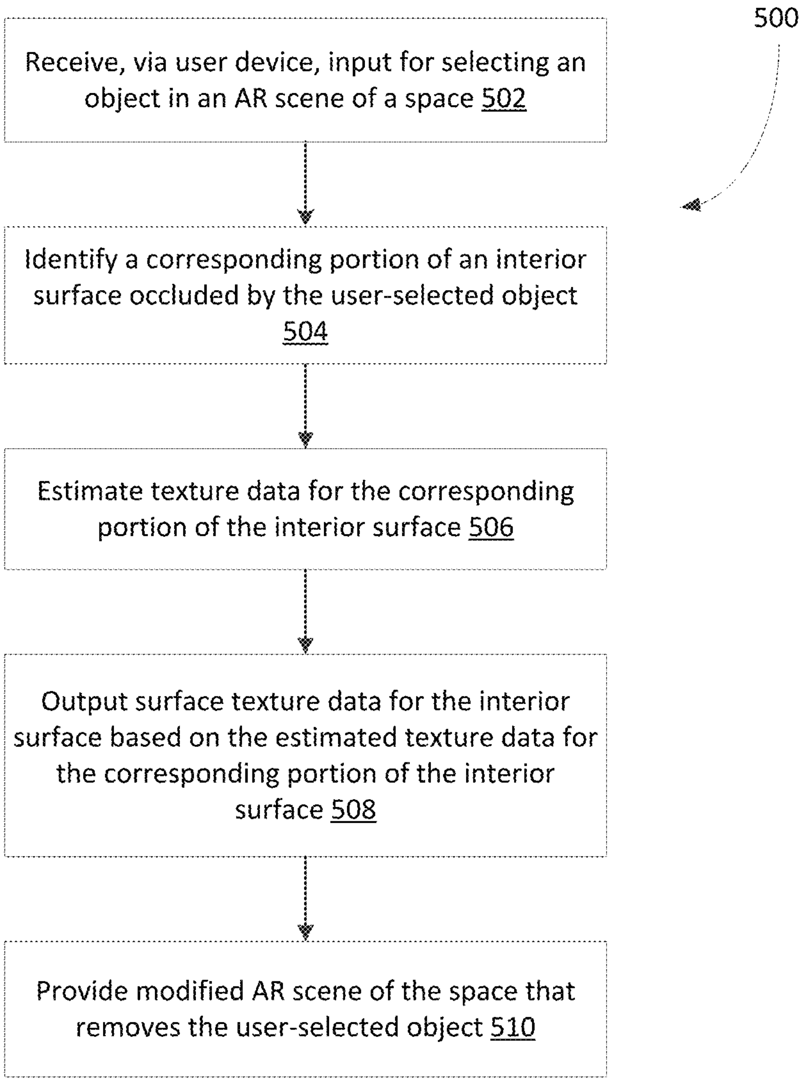
FIG. 5 shows, in flowchart form, an example method for generating an AR scene of a real-world space.

Reference is now made to FIG. 5, which shows, in flowchart form, an example method 500 for generating an AR scene of a real-world space. The method 500 may be performed by a computing system that supports generation of AR content, such as the AR engine 210 of FIG. 1. In particular, an AR engine may implement the operations of method 500 for removing user-selected objects from an AR scene of a real-world space. The operations of method 500 may be performed in addition to, or as alternatives of, one or more of the operations of methods 300 and 400.

Using an AR-enabled computing device, a user can view an AR scene depicting a real-world space. For example, an AR scene of a room and its contents (e.g., room-defining features such as doors and walls, furniture, appliances, etc.) may be viewed using the computing device. The AR scene comprises a 3D model of the room which may be constructed based on geometric scan data captured using the computing device. In operation 502, the AR engine receives, via the computing device, input for selecting an object in the AR scene. In some embodiments, the AR engine may provide indications of selectable objects or features of the AR scene. For example, the AR scene may include computer-generated graphical indicators for identifying those objects in the scene that are selectable by a user. The selection may be input using an input interface such as a touchscreen display or wearable device, voice recognition of user commands, or a gesture detection application for detecting and tracking hand gestures.

In operation 504, the AR engine identifies a corresponding portion of an interior surface of the real-world space that is occluded by the user-selected object. The AR engine then estimates texture data for the occluded portion of the interior surface. Operations 504 and 506 may be implemented in a similar manner as operations 306 and 308 of method 300, respectively.

The AR engine outputs surface texture data for the interior surface based on the estimated texture data for the occluded portion, in operation 508. In operation 510, the AR engine provides a modified AR scene of the real-world space with the user-selected object removed. In particular, the initial AR scene is replaced with a modified AR scene that does not contain a representation of the user-selected object. That is, the user-selected object is removed from the AR scene without affecting other parts of the scene. The interior surface that is occluded by the user-selected object is "restored" by texturing the surface based on the estimated texture data. As part of operation 510, the AR engine modifies the 3D model associated with the real-world space to remove a representation of the user-selected object. In particular, contour information associated with the user-selected object or a bounding box for the user-selected object may be deleted from the 3D model. The modified 3D model can then be textured so as to include the estimated texture data for the occluded interior surface.

Figure 6:
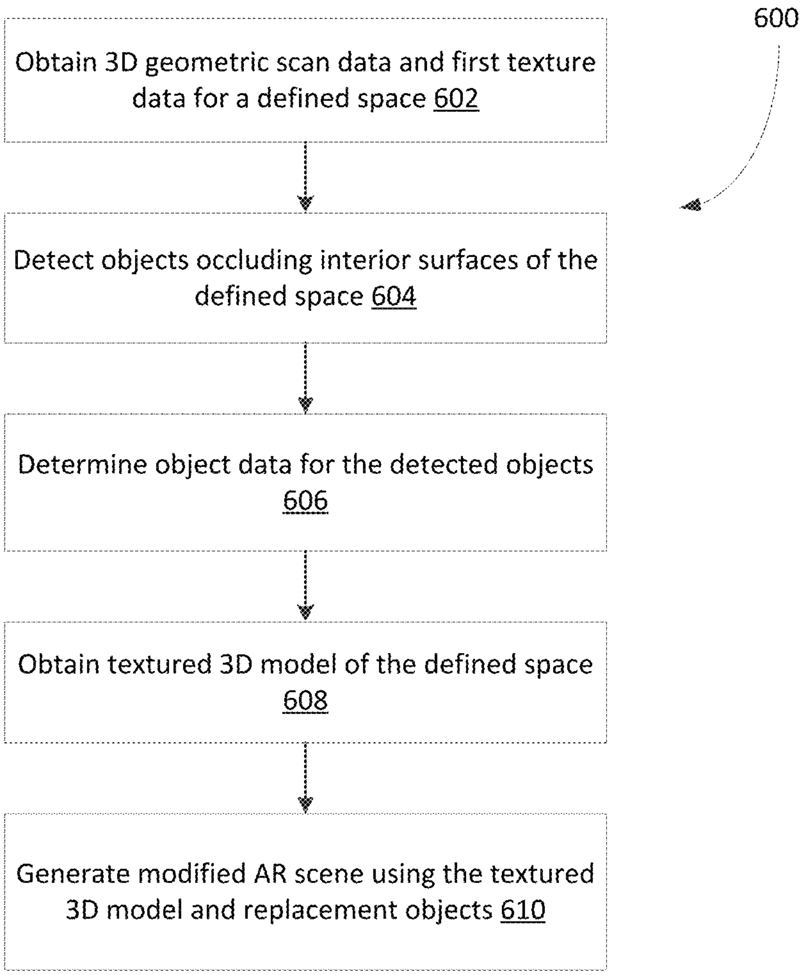
FIG. 6 shows, in flowchart form, another example method for generating an AR scene of a real-world space.

Reference is now made to FIG. 6, which shows, in flowchart form, another example method 600 for generating an AR scene of a real-world space. The method 600 may be performed by a computing system that supports generation of AR content, such as the AR engine 210 of FIG. 1. The AR engine may implement the operations of method 600 for replacing objects in an AR scene of a real-world space. The operations of method 600 may be performed in addition to, or as alternatives of, one or more of the operations of methods 300 to 500.

In operation 602, the AR engine obtains 3D geometric scan data and first texture data for a real-world space. In at least some embodiments, the 3D scan data comprises at least one of camera data or LiDAR scanner data. The scan data may be received via a computing device that is used to perform a real-time 3D scan of the real-world space. The 3D scan captures the physical surroundings of the real-world space, including any interior surfaces and objects in the space.

The AR engine detects objects occluding interior surfaces of the real-world space, in operation 604. Using the captured 3D scan data, the AR engine performs object detection in images/video frames to identify objects that occlude any part of an interior surface.

In operation 606, the AR engine determines object data for the detected occluding objects. The object data of an object may indicate, among others: type of object; size of object; location, position, and orientation of object; and the like. The AR engine may query an object or product database to retrieve the object data, or it may determine the object data based on analysis of the image and depth data.

In operation 608, the AR engine obtains a textured 3D model of the real-world space. The textured 3D model represents a digital twin of the space, and includes 3D representations of objects and space-defining features of the real-world space. In some embodiments, the model may represent a modification of the real-world space in that certain ones of the detected objects are removed from the scene. In particular, the model may represent the real-world space that does not contain certain occluding objects. The texture data associated with the model may then comprise estimated surface texture data for the occluded interior surfaces corresponding to the removed objects.

In operation 610, the AR engine generates modified AR scene using the textured 3D model and replacement objects. The textured 3D model effectively serves as a backdrop against which different replacement objects may be displayed in 3D AR scenes. For example, a customer may request to "reset" an indoor space, such as a living room, to remove certain user-selected objects that are currently in the space. The textured 3D model represents the space with the user-selected objects removed. The customer can then identify different sets of replacement objects for the removed objects against the backdrop of the "reset" space.

Figure 10A:
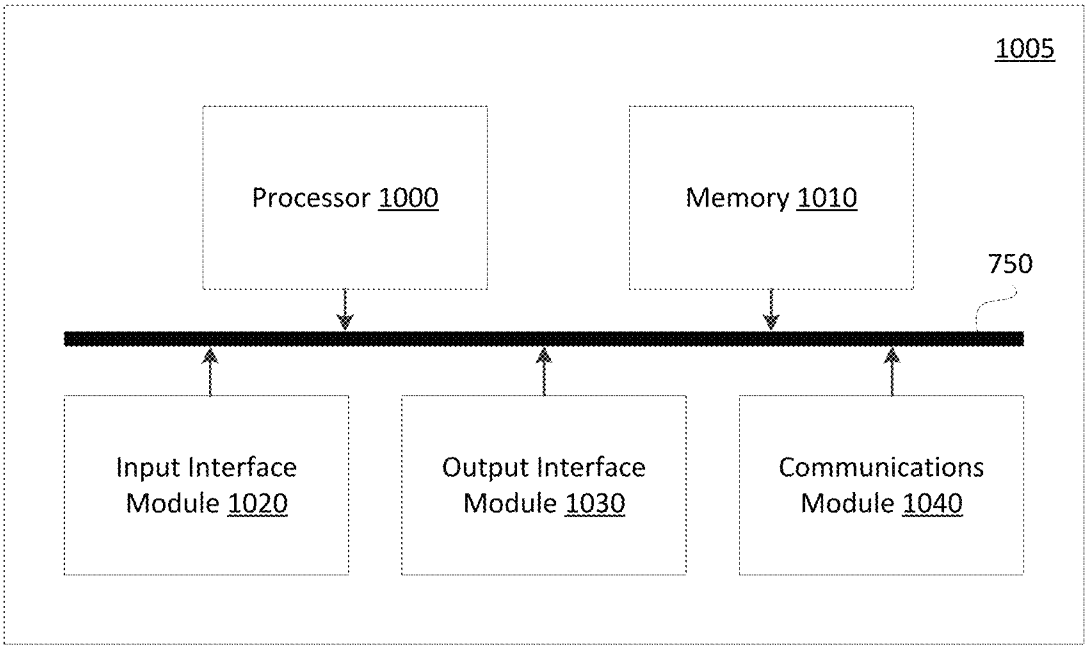
FIG. 10A is a high-level schematic diagram of an example computing device.

The above-described methods may be implemented by way of a suitably programmed computing device. FIG. 10A is a high-level operation diagram of an example computing device 1005. The example computing device 1005 includes a variety of modules. For example, as illustrated, the example computing device 1005, may include a processor 1000, a memory 1010, an input interface module 1020, an output interface module 1030, and a communications module 1040. As illustrated, the foregoing example modules of the example computing device 1005 are in communication over a bus 1050.

The processor 1000 is a hardware processor. The processor 1000 may, for example, be one or more ARM, Intel x86, PowerPC processors or the like.

The memory 1010 allows data to be stored and retrieved. The memory 1010 may include, for example, random access memory, read-only memory, and persistent storage. Persistent storage may be, for example, flash memory, a solid-state drive or the like. Read-only memory and persistent storage are a computer-readable medium. A computer-readable medium may be organized using a file system such as may be administered by an operating system governing overall operation of the example computing device 1005.

The input interface module 1020 allows the example computing device 1005 to receive input signals. Input signals may, for example, correspond to input received from a user. The input interface module 1020 may serve to interconnect the example computing device 1005 with one or more input devices. Input signals may be received from input devices by the input interface module 1020. Input devices may, for example, include one or more of a touchscreen input, keyboard, trackball or the like. In some embodiments, all or a portion of the input interface module 1020 may be integrated with an input device. For example, the input interface module 1020 may be integrated with one of the aforementioned examples of input devices.

The output interface module 1030 allows the example computing device 1005 to provide output signals. Some output signals may, for example allow provision of output to a user. The output interface module 1030 may serve to interconnect the example computing device 1005 with one or more output devices. Output signals may be sent to output devices by output interface module 1030. Output devices may include, for example, a display screen such as, for example, a liquid crystal display (LCD), a touchscreen display. Additionally, or alternatively, output devices may include devices other than screens such as, for example, a speaker, indicator lamps (such as for, example, light-emitting diodes (LEDs)), and printers. In some embodiments, all or a portion of the output interface module 1030 may be integrated with an output device. For example, the output interface module 1030 may be integrated with one of the aforementioned example output devices.

The communications module 1040 allows the example computing device 1005 to communicate with other electronic devices and/or various communications networks. For example, the communications module 1040 may allow the example computing device 1005 to send or receive communications signals. Communications signals may be sent or received according to one or more protocols or according to one or more standards. For example, the communications module 1040 may allow the example computing device 1005 to communicate via a cellular data network, such as for example, according to one or more standards such as, for example, Global System for Mobile Communications (GSM), Code Division Multiple Access (CDMA), Evolution Data Optimized (EVDO), Long-term Evolution (LTE) or the like. Additionally, or alternatively, the communications module 1040 may allow the example computing device 1005 to communicate using near-field communication (NFC), via Wi-Fi™, using Bluetooth™ or via some combination of one or more networks or protocols. Contactless payments may be made using NFC. In some embodiments, all or a portion of the communications module 1040 may be integrated into a component of the example computing device 1005. For example, the communications module may be integrated into a communications chipset.

Software comprising instructions is executed by the processor 1000 from a computer-readable medium. For example, software may be loaded into random-access memory from persistent storage of memory 1010. Additionally, or alternatively, instructions may be executed by the processor 1000 directly from read-only memory of memory 1010.

Figure 10B:
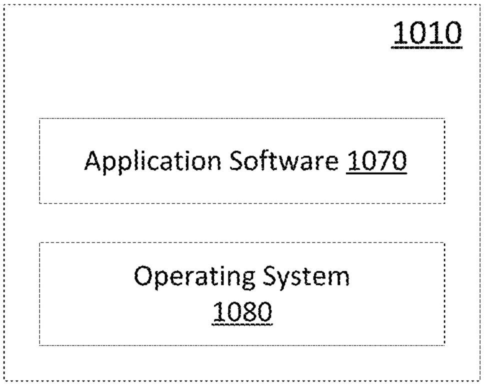
FIG. 10B shows a simplified organization of software components stored in a memory of the computing device of FIG. 10A.

FIG. 10B depicts a simplified organization of software components stored in memory 1010 of the example computing device 105. As illustrated these software components include an operating system 1080 and application software 1070.

The operating system 1080 is software. The operating system 1080 allows the application software 1070 to access the processor 1000, the memory 1010, the input interface module 1020, the output interface module 1030, and the communications module 1040. The operating system 1080 may be, for example, Apple™ OS X, Android™, Microsoft™ Windows™, a Linux distribution, or the like.

The application software 1070 adapts the example computing device 1005, in combination with the operating system 1080, to operate as a device performing particular functions.

Example E-Commerce Platform

Although not required, in some embodiments, the methods disclosed herein may be performed on or in association with an e-commerce platform. An example of an e-commerce platform will now be described.

Figure 11:
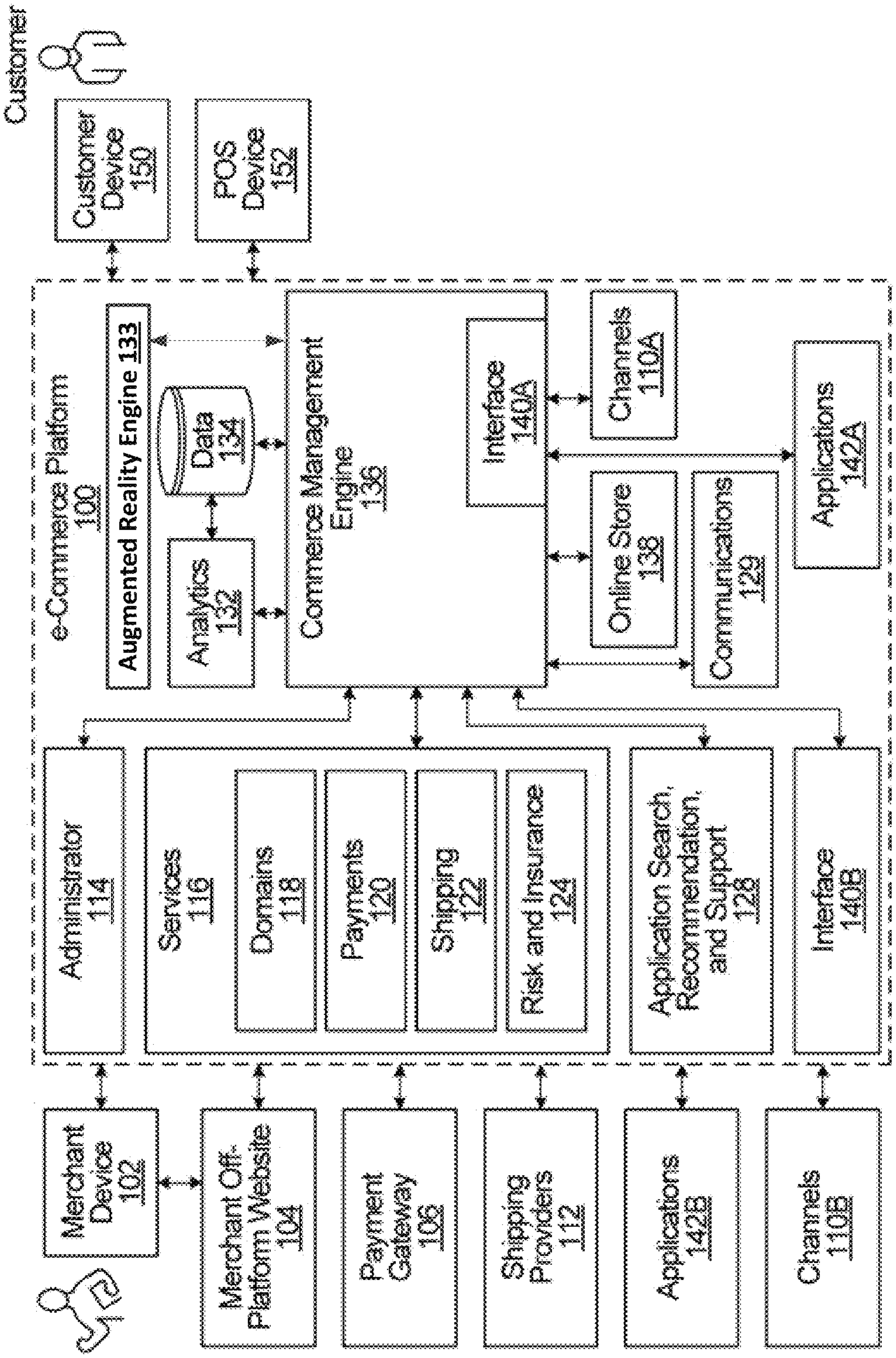
FIG. 11 is a block diagram of an e-commerce platform, in accordance with an example embodiment.

FIG. 11 illustrates an example e-commerce platform 100, according to one embodiment. The e-commerce platform 100 may be exemplary of the e-commerce platform 205 described with reference to FIG. 2. The e-commerce platform 100 may be used to provide merchant products and services to customers. While the disclosure contemplates using the apparatus, system, and process to purchase products and services, for simplicity the description herein will refer to products. All references to products throughout this disclosure should also be understood to be references to products and/or services, including, for example, physical products, digital content (e.g., music, videos, games), software, tickets, subscriptions, services to be provided, and the like.

While the disclosure throughout contemplates that a 'merchant' and a 'customer' may be more than individuals, for simplicity the description herein may generally refer to merchants and customers as such. All references to merchants and customers throughout this disclosure should also be understood to be references to groups of individuals, companies, corporations, computing entities, and the like, and may represent for-profit or not-for-profit exchange of products. Further, while the disclosure throughout refers to 'merchants' and 'customers', and describes their roles as such, the e-commerce platform 100 should be understood to more generally support users in an e-commerce environment, and all references to merchants and customers throughout this disclosure should also be understood to be references to users, such as where a user is a merchant-user (e.g., a seller, retailer, wholesaler, or provider of products), a customer-user (e.g., a buyer, purchase agent, consumer, or user of products), a prospective user (e.g., a user browsing and not yet committed to a purchase, a user evaluating the e-commerce platform 100 for potential use in marketing and selling products, and the like), a service provider user (e.g., a shipping provider 112, a financial provider, and the like), a company or corporate user (e.g., a company representative for purchase, sales, or use of products; an enterprise user; a customer relations or customer management agent, and the like), an information technology user, a computing entity user (e.g., a computing bot for purchase, sales, or use of products), and the like. Furthermore, it may be recognized that while a given user may act in a given role (e.g., as a merchant) and their associated device may be referred to accordingly (e.g., as a merchant device) in one context, that same individual may act in a different role in another context (e.g., as a customer) and that same or another associated device may be referred to accordingly (e.g., as a customer device). For example, an individual may be a merchant for one type of product (e.g., shoes), and a customer/consumer of other types of products (e.g., groceries). In another example, an individual may be both a consumer and a merchant of the same type of product. In a particular example, a merchant that trades in a particular category of goods may act as a customer for that same category of goods when they order from a wholesaler (the wholesaler acting as merchant).

The e-commerce platform 100 provides merchants with online services/facilities to manage their business. The facilities described herein are shown implemented as part of the platform 100 but could also be configured separately from the platform 100, in whole or in part, as stand-alone services. Furthermore, such facilities may, in some embodiments, additionally or alternatively, be provided by one or more providers/entities.

In the example of FIG. 11, the facilities are deployed through a machine, service or engine that executes computer software, modules, program codes, and/or instructions on one or more processors which, as noted above, may be part of or external to the platform 100. Merchants may utilize the e-commerce platform 100 for enabling or managing commerce with customers, such as by implementing an e-commerce experience with customers through an online store 138, applications 142A-B, channels 110A-B, and/or through point of sale (POS) devices 152 in physical locations (e.g., a physical storefront or other location such as through a kiosk, terminal, reader, printer, 3D printer, and the like). A merchant may utilize the e-commerce platform 100 as a sole commerce presence with customers, or in conjunction with other merchant commerce facilities, such as through a physical store (e.g., 'brick-and-mortar' retail stores), a merchant off-platform website 104 (e.g., a commerce Internet website or other internet or web property or asset supported by or on behalf of the merchant separately from the e-commerce platform 100), an application 142B, and the like. However, even these 'other' merchant commerce facilities may be incorporated into or communicate with the e-commerce platform 100, such as where POS devices 152 in a physical store of a merchant are linked into the e-commerce platform 100, where a merchant off-platform website 104 is tied into the e-commerce platform 100, such as, for example, through 'buy buttons' that link content from the merchant off platform website 104 to the online store 138, or the like.

The online store 138 may represent a multi-tenant facility comprising a plurality of virtual storefronts. In embodiments, merchants may configure and/or manage one or more storefronts in the online store 138, such as, for example, through a merchant device 102 (e.g., computer, laptop computer, mobile computing device, and the like), and offer products to customers through a number of different channels 110A-B (e.g., an online store 138; an application 142A-B; a physical storefront through a POS device 152; an electronic marketplace, such, for example, through an electronic buy button integrated into a website or social media channel such as on a social network, social media page, social media messaging system; and/or the like). A merchant may sell across channels 110A-B and then manage their sales through the e-commerce platform 100, where channels 110A may be provided as a facility or service internal or external to the e-commerce platform 100. A merchant may, additionally or alternatively, sell in their physical retail store, at pop ups, through wholesale, over the phone, and the like, and then manage their sales through the e-commerce platform 100. A merchant may employ all or any combination of these operational modalities. Notably, it may be that by employing a variety of and/or a particular combination of modalities, a merchant may improve the probability and/or volume of sales. Throughout this disclosure, the terms online store and storefront may be used synonymously to refer to a merchant's online e-commerce service offering through the e-commerce platform 100, where an online store 138 may refer either to a collection of storefronts supported by the e-commerce platform 100 (e.g., for one or a plurality of merchants) or to an individual merchant's storefront (e.g., a merchant's online store).

In some embodiments, a customer may interact with the platform 100 through a customer device 150 (e.g., computer, laptop computer, mobile computing device, or the like), a POS device 152 (e.g., retail device, kiosk, automated (self-service) checkout system, or the like), and/or any other commerce interface device known in the art. The e-commerce platform 100 may enable merchants to reach customers through the online store 138, through applications 142A-B, through POS devices 152 in physical locations (e.g., a merchant's storefront or elsewhere), to communicate with customers via electronic communication facility 129, and/or the like so as to provide a system for reaching customers and facilitating merchant services for the real or virtual pathways available for reaching and interacting with customers.

In some embodiments, and as described further herein, the e-commerce platform 100 may be implemented through a processing facility. Such a processing facility may include a processor and a memory. The processor may be a hardware processor. The memory may be and/or may include a transitory memory such as for example, random access memory (RAM), and/or a non-transitory memory such as, for example, a non-transitory computer readable medium such as, for example, persisted storage (e.g., magnetic storage). The processing facility may store a set of instructions (e.g., in the memory) that, when executed, cause the e-commerce platform 100 to perform the e-commerce and support functions as described herein. The processing facility may be or may be a part of one or more of a server, client, network infrastructure, mobile computing platform, cloud computing platform, stationary computing platform, and/or some other computing platform, and may provide electronic connectivity and communications between and amongst the components of the e-commerce platform 100, merchant devices 102, payment gateways 106, applications 142A-B, channels 110A-B, shipping providers 112, customer devices 150, point of sale devices 152, etc. In some implementations, the processing facility may be or may include one or more such computing devices acting in concert. For example, it may be that a plurality of co-operating computing devices serves as/to provide the processing facility. The e-commerce platform 100 may be implemented as or using one or more of a cloud computing service, software as a service (SaaS), infrastructure as a service (IaaS), platform as a service (PaaS), desktop as a service (DaaS), managed software as a service (MSaaS), mobile backend as a service (MBaaS), information technology management as a service (ITMaaS), and/or the like. For example, it may be that the underlying software implementing the facilities described herein (e.g., the online store 138) is provided as a service, and is centrally hosted (e.g., and then accessed by users via a web browser or other application, and/or through customer devices 150, POS devices 152, and/or the like). In some embodiments, elements of the e-commerce platform 100 may be implemented to operate and/or integrate with various other platforms and operating systems.

In some embodiments, the facilities of the e-commerce platform 100 (e.g., the online store 138) may serve content to a customer device 150 (using data 134) such as, for example, through a network connected to the e-commerce platform 100. For example, the online store 138 may serve or send content in response to requests for data 134 from the customer device 150, where a browser (or other application) connects to the online store 138 through a network using a network communication protocol (e.g., an internet protocol). The content may be written in machine readable language and may include Hypertext Markup Language (HTML), template language, JavaScript, and the like, and/or any combination thereof.

In some embodiments, online store 138 may be or may include service instances that serve content to customer devices and allow customers to browse and purchase the various products available (e.g., add them to a cart, purchase through a buy-button, and the like). Merchants may also customize the look and feel of their website through a theme system, such as, for example, a theme system where merchants can select and change the look and feel of their online store 138 by changing their theme while having the same underlying product and business data shown within the online store's product information. It may be that themes can be further customized through a theme editor, a design interface that enables users to customize their website's design with flexibility. Additionally, or alternatively, it may be that themes can, additionally or alternatively, be customized using theme-specific settings such as, for example, settings as may change aspects of a given theme, such as, for example, specific colors, fonts, and pre-built layout schemes. In some implementations, the online store may implement a content management system for website content. Merchants may employ such a content management system in authoring blog posts or static pages and publish them to their online store 138, such as through blogs, articles, landing pages, and the like, as well as configure navigation menus. Merchants may upload images (e.g., for products), video, content, data, and the like to the e-commerce platform 100, such as for storage by the system (e.g., as data 134). In some embodiments, the e-commerce platform 100 may provide functions for manipulating such images and content such as, for example, functions for resizing images, associating an image with a product, adding and associating text with an image, adding an image for a new product variant, protecting images, and the like.

As described herein, the e-commerce platform 100 may provide merchants with sales and marketing services for products through a number of different channels 110A-B, including, for example, the online store 138, applications 142A-B, as well as through physical POS devices 152 as described herein. The e-commerce platform 100 may, additionally or alternatively, include business support services 116, an administrator 114, a warehouse management system, and the like associated with running an on-line business, such as, for example, one or more of providing a domain registration service 118 associated with their online store, payment services 120 for facilitating transactions with a customer, shipping services 122 for providing customer shipping options for purchased products, fulfillment services for managing inventory, risk and insurance services 124 associated with product protection and liability, merchant billing, and the like. Services 116 may be provided via the e-commerce platform 100 or in association with external facilities, such as through a payment gateway 106 for payment processing, shipping providers 112 for expediting the shipment of products, and the like.

In some embodiments, the e-commerce platform 100 may be configured with shipping services 122 (e.g., through an e-commerce platform shipping facility or through a third-party shipping carrier), to provide various shipping-related information to merchants and/or their customers such as, for example, shipping label or rate information, real-time delivery updates, tracking, and/or the like.

Figure 12:
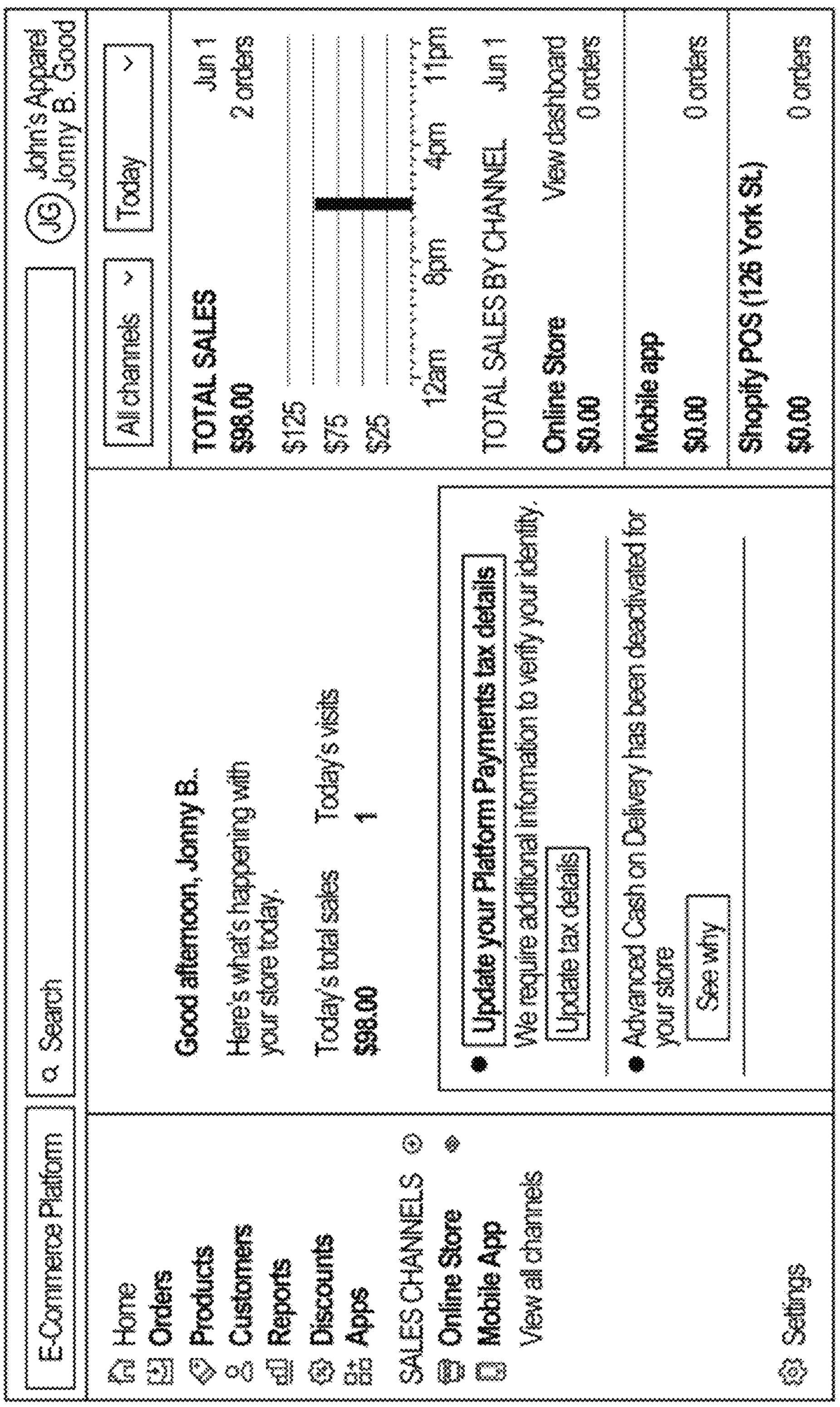
FIG. 12 is an example of a home page of an administrator, in accordance with an example embodiment.

FIG. 12 depicts a non-limiting embodiment for a home page of an administrator 114. The administrator 114 may be referred to as an administrative console and/or an administrator console. The administrator 114 may show information about daily tasks, a store's recent activity, and the next steps a merchant can take to build their business. In some embodiments, a merchant may log in to the administrator 114 via a merchant device 102 (e.g., a desktop computer or mobile device), and manage aspects of their online store 138, such as, for example, viewing the online store's 138 recent visit or order activity, updating the online store's 138 catalog, managing orders, and/or the like. In some embodiments, the merchant may be able to access the different sections of the administrator 114 by using a sidebar, such as the one shown on FIG. 12. Sections of the administrator 114 may include various interfaces for accessing and managing core aspects of a merchant's business, including orders, products, customers, available reports and discounts. The administrator 114 may, additionally or alternatively, include interfaces for managing sales channels for a store including the online store 138, mobile application(s) made available to customers for accessing the store (Mobile App), POS devices, and/or a buy button. The administrator 114 may, additionally or alternatively, include interfaces for managing applications (apps) installed on the merchant's account; and settings applied to a merchant's online store 138 and account. A merchant may use a search bar to find products, pages, or other information in their store.

More detailed information about commerce and visitors to a merchant's online store 138 may be viewed through reports or metrics. Reports may include, for example, acquisition reports, behavior reports, customer reports, finance reports, marketing reports, sales reports, product reports, and custom reports. The merchant may be able to view sales data for different channels 110A-B from different periods of time (e.g., days, weeks, months, and the like), such as by using drop-down menus. An overview dashboard may also be provided for a merchant who wants a more detailed view of the store's sales and engagement data. An activity feed in the home metrics section may be provided to illustrate an overview of the activity on the merchant's account. For example, by clicking on a 'view all recent activity' dashboard button, the merchant may be able to see a longer feed of recent activity on their account. A home page may show notifications about the merchant's online store 138, such as based on account status, growth, recent customer activity, order updates, and the like. Notifications may be provided to assist a merchant with navigating through workflows configured for the online store 138, such as, for example, a payment workflow, an order fulfillment workflow, an order archiving workflow, a return workflow, and the like.

The e-commerce platform 100 may provide for a communications facility 129 and associated merchant interface for providing electronic communications and marketing, such as utilizing an electronic messaging facility for collecting and analyzing communication interactions between merchants, customers, merchant devices 102, customer devices 150, POS devices 152, and the like, to aggregate and analyze the communications, such as for increasing sale conversions, and the like. For instance, a customer may have a question related to a product, which may produce a dialog between the customer and the merchant (or an automated processor-based agent/chatbot representing the merchant), where the communications facility 129 is configured to provide automated responses to customer requests and/or provide recommendations to the merchant on how to respond such as, for example, to improve the probability of a sale.

The e-commerce platform 100 may provide a financial facility 120 for secure financial transactions with customers, such as through a secure card server environment. The e-commerce platform 100 may store credit card information, such as in payment card industry data (PCI) environments (e.g., a card server), to reconcile financials, bill merchants, perform automated clearing house (ACH) transfers between the e-commerce platform 100 and a merchant's bank account, and the like. The financial facility 120 may also provide merchants and buyers with financial support, such as through the lending of capital (e.g., lending funds, cash advances, and the like) and provision of insurance. In some embodiments, online store 138 may support a number of independently administered storefronts and process a large volume of transactional data on a daily basis for a variety of products and services. Transactional data may include any customer information indicative of a customer, a customer account or transactions carried out by a customer such as. for example, contact information, billing information, shipping information, returns/refund information, discount/offer information, payment information, or online store events or information such as page views, product search information (search keywords, click-through events), product reviews, abandoned carts, and/or other transactional information associated with business through the e-commerce platform 100. In some embodiments, the e-commerce platform 100 may store this data in a data facility 134. Referring again to FIG. 11, in some embodiments the e-commerce platform 100 may include a commerce management engine 136 such as may be configured to perform various workflows for task automation or content management related to products, inventory, customers, orders, suppliers, reports, financials, risk and fraud, and the like. In some embodiments, additional functionality may, additionally or alternatively, be provided through applications 142A-B to enable greater flexibility and customization required for accommodating an ever-growing variety of online stores, POS devices, products, and/or services. Applications 142A may be components of the e-commerce platform 100 whereas applications 142B may be provided or hosted as a third-party service external to e-commerce platform 100. The commerce management engine 136 may accommodate store-specific workflows and in some embodiments, may incorporate the administrator 114 and/or the online store 138.

Implementing functions as applications 142A-B may enable the commerce management engine 136 to remain responsive and reduce or avoid service degradation or more serious infrastructure failures, and the like.

Although isolating online store data can be important to maintaining data privacy between online stores 138 and merchants, there may be reasons for collecting and using cross-store data, such as for example, with an order risk assessment system or a platform payment facility, both of which require information from multiple online stores 138 to perform well. In some embodiments, it may be preferable to move these components out of the commerce management engine 136 and into their own infrastructure within the e-commerce platform 100.

Platform payment facility 120 is an example of a component that utilizes data from the commerce management engine 136 but is implemented as a separate component or service. The platform payment facility 120 may allow customers interacting with online stores 138 to have their payment information stored safely by the commerce management engine 136 such that they only have to enter it once. When a customer visits a different online store 138, even if they have never been there before, the platform payment facility 120 may recall their information to enable a more rapid and/or potentially less-error prone (e.g., through avoidance of possible mis-keying of their information if they needed to instead re-enter it) checkout. This may provide a cross-platform network effect, where the e-commerce platform 100 becomes more useful to its merchants and buyers as more merchants and buyers join, such as because there are more customers who checkout more often because of the ease of use with respect to customer purchases. To maximize the effect of this network, payment information for a given customer may be retrievable and made available globally across multiple online stores 138.

For functions that are not included within the commerce management engine 136, applications 142A-B provide a way to add features to the e-commerce platform 100 or individual online stores 138. For example, applications 142A-B may be able to access and modify data on a merchant's online store 138, perform tasks through the administrator 114, implement new flows for a merchant through a user interface (e.g., that is surfaced through extensions/API), and the like. Merchants may be enabled to discover and install applications 142A-B through application search, recommendations, and support 128. In some embodiments, the commerce management engine 136, applications 142A-B, and the administrator 114 may be developed to work together. For instance, application extension points may be built inside the commerce management engine 136, accessed by applications 142A and 142B through the interfaces 140B and 140A to deliver additional functionality, and surfaced to the merchant in the user interface of the administrator 114.

In some embodiments, applications 142A-B may deliver functionality to a merchant through the interface 140A-B, such as where an application 142A-B is able to surface transaction data to a merchant (e.g., App: "Engine, surface my app data in the Mobile App or administrator 114"), and/or where the commerce management engine 136 is able to ask the application to perform work on demand (Engine: "App, give me a local tax calculation for this checkout").

Applications 142A-B may be connected to the commerce management engine 136 through an interface 140A-B (e.g., through REST (REpresentational State Transfer) and/or GraphQL APIs) to expose the functionality and/or data available through and within the commerce management engine 136 to the functionality of applications. For instance, the e-commerce platform 100 may provide API interfaces 140A-B to applications 142A-B which may connect to products and services external to the platform 100. The flexibility offered through use of applications and APIs (e.g., as offered for application development) enable the e-commerce platform 100 to better accommodate new and unique needs of merchants or to address specific use cases without requiring constant change to the commerce management engine 136. For instance, shipping services 122 may be integrated with the commerce management engine 136 through a shipping or carrier service API, thus enabling the e-commerce platform 100 to provide shipping service functionality without directly impacting code running in the commerce management engine 136.

Depending on the implementation, applications 142A-B may utilize APIs to pull data on demand (e.g., customer creation events, product change events, or order cancelation events, etc.) or have the data pushed when updates occur. A subscription model may be used to provide applications 142A-B with events as they occur or to provide updates with respect to a changed state of the commerce management engine 136. In some embodiments, when a change related to an update event subscription occurs, the commerce management engine 136 may post a request, such as to a predefined callback URL. The body of this request may contain a new state of the object and a description of the action or event. Update event subscriptions may be created manually, in the administrator facility 114, or automatically (e.g., via the API 140A-B). In some embodiments, update events may be queued and processed asynchronously from a state change that triggered them, which may produce an update event notification that is not distributed in real-time or near-real time.

In some embodiments, the e-commerce platform 100 may provide one or more of application search, recommendation and support 128. Application search, recommendation and support 128 may include developer products and tools to aid in the development of applications, an application dashboard (e.g., to provide developers with a development interface, to administrators for management of applications, to merchants for customization of applications, and the like), facilities for installing and providing permissions with respect to providing access to an application 142A-B (e.g., for public access, such as where criteria must be met before being installed, or for private use by a merchant), application searching to make it easy for a merchant to search for applications 142A-B that satisfy a need for their online store 138, application recommendations to provide merchants with suggestions on how they can improve the user experience through their online store 138, and the like. In some embodiments, applications 142A-B may be assigned an application identifier (ID), such as for linking to an application (e.g., through an API), searching for an application, making application recommendations, and the like.

Applications 142A-B may be grouped roughly into three categories: customer-facing applications, merchant-facing applications, integration applications, and the like. Customer-facing applications 142A-B may include an online store 138 or channels 110A-B that are places where merchants can list products and have them purchased (e.g., the online store, applications for flash sales (e.g., merchant products or from opportunistic sales opportunities from third-party sources), a mobile store application, a social media channel, an application for providing wholesale purchasing, and the like). Merchant-facing applications 142A-B may include applications that allow the merchant to administer their online store 138 (e.g., through applications related to the web or website or to mobile devices), run their business (e.g., through applications related to POS devices), to grow their business (e.g., through applications related to shipping (e.g., drop shipping), use of automated agents, use of process flow development and improvements), and the like. Integration applications may include applications that provide useful integrations that participate in the running of a business, such as shipping providers 112 and payment gateways 106.

As such, the e-commerce platform 100 can be configured to provide an online shopping experience through a flexible system architecture that enables merchants to connect with customers in a flexible and transparent manner. A typical customer experience may be better understood through an embodiment example purchase workflow, where the customer browses the merchant's products on a channel 110A-B, adds what they intend to buy to their cart, proceeds to checkout, and pays for the content of their cart resulting in the creation of an order for the merchant. The merchant may then review and fulfill (or cancel) the order. The product is then delivered to the customer. If the customer is not satisfied, they might return the products to the merchant.

In an example embodiment, a customer may browse a merchant's products through a number of different channels 110A-B such as, for example, the merchant's online store 138, a physical storefront through a POS device 152; an electronic marketplace, through an electronic buy button integrated into a website or a social media channel). In some cases, channels 110A-B may be modeled as applications 142A-B A merchandising component in the commerce management engine 136 may be configured for creating, and managing product listings (using product data objects or models for example) to allow merchants to describe what they want to sell and where they sell it. The association between a product listing and a channel may be modeled as a product publication and accessed by channel applications, such as via a product listing API. A product may have many attributes and/or characteristics, like size and color, and many variants that expand the available options into specific combinations of all the attributes, like a variant that is size extra-small and green, or a variant that is size large and blue. Products may have at least one variant (e.g., a "default variant") created for a product without any options. To facilitate browsing and management, products may be grouped into collections, provided product identifiers (e.g., stock keeping unit (SKU)) and the like. Collections of products may be built by either manually categorizing products into one (e.g., a custom collection), by building rulesets for automatic classification (e.g., a smart collection), and the like. Product listings may include 2D images, 3D images or models, which may be viewed through a virtual or augmented reality interface, and the like.

In some embodiments, a shopping cart object is used to store or keep track of the products that the customer intends to buy. The shopping cart object may be channel specific and can be composed of multiple cart line items, where each cart line item tracks the quantity for a particular product variant. Since adding a product to a cart does not imply any commitment from the customer or the merchant, and the expected lifespan of a cart may be in the order of minutes (not days), cart objects/data representing a cart may be persisted to an ephemeral data store.

The customer then proceeds to checkout. A checkout object or page generated by the commerce management engine 136 may be configured to receive customer information to complete the order such as the customer's contact information, billing information and/or shipping details. If the customer inputs their contact information but does not proceed to payment, the e-commerce platform 100 may (e.g., via an abandoned checkout component) to transmit a message to the customer device 150 to encourage the customer to complete the checkout. For those reasons, checkout objects can have much longer lifespans than cart objects (hours or even days) and may therefore be persisted. Customers then pay for the content of their cart resulting in the creation of an order for the merchant. In some embodiments, the commerce management engine 136 may be configured to communicate with various payment gateways and services (e.g., online payment systems, mobile payment systems, digital wallets, credit card gateways) via a payment processing component. The actual interactions with the payment gateways 106 may be provided through a card server environment. At the end of the checkout process, an order is created. An order is a contract of sale between the merchant and the customer where the merchant agrees to provide the goods and services listed on the order (e.g., order line items, shipping line items, and the like) and the customer agrees to provide payment (including taxes). Once an order is created, an order confirmation notification may be sent to the customer and an order placed notification sent to the merchant via a notification component. Inventory may be reserved when a payment processing job starts to avoid over-selling (e.g., merchants may control this behavior using an inventory policy or configuration for each variant). Inventory reservation may have a short time span (minutes) and may need to be fast and scalable to support flash sales or "drops", which are events during which a discount, promotion or limited inventory of a product may be offered for sale for buyers in a particular location and/or for a particular (usually short) time. The reservation is released if the payment fails. When the payment succeeds, and an order is created, the reservation is converted into a permanent (long-term) inventory commitment allocated to a specific location. An inventory component of the commerce management engine 136 may record where variants are stocked, and tracks quantities for variants that have inventory tracking enabled. It may decouple product variants (a customer-facing concept representing the template of a product listing) from inventory items (a merchant-facing concept that represents an item whose quantity and location is managed). An inventory level component may keep track of quantities that are available for sale, committed to an order or incoming from an inventory transfer component (e.g., from a vendor).

The merchant may then review and fulfill (or cancel) the order. A review component of the commerce management engine 136 may implement a business process merchant's use to ensure orders are suitable for fulfillment before actually fulfilling them. Orders may be fraudulent, require verification (e.g., ID checking), have a payment method which requires the merchant to wait to make sure they will receive their funds, and the like. Risks and recommendations may be persisted in an order risk model. Order risks may be generated from a fraud detection tool, submitted by a third-party through an order risk API, and the like. Before proceeding to fulfillment, the merchant may need to capture the payment information (e.g., credit card information) or wait to receive it (e.g., via a bank transfer, check, and the like) before it marks the order as paid. The merchant may now prepare the products for delivery. In some embodiments, this business process may be implemented by a fulfillment component of the commerce management engine 136. The fulfillment component may group the line items of the order into a logical fulfillment unit of work based on an inventory location and fulfillment service. The merchant may review, adjust the unit of work, and trigger the relevant fulfillment services, such as through a manual fulfillment service (e.g., at merchant managed locations) used when the merchant picks and packs the products in a box, purchase a shipping label and input its tracking number, or just mark the item as fulfilled. Alternatively, an API fulfillment service may trigger a third-party application or service to create a fulfillment record for a third-party fulfillment service. Other possibilities exist for fulfilling an order. If the customer is not satisfied, they may be able to return the product(s) to the merchant. The business process merchants may go through to "un-sell" an item may be implemented by a return component. Returns may consist of a variety of different actions, such as a restock, where the product that was sold actually comes back into the business and is sellable again; a refund, where the money that was collected from the customer is partially or fully returned; an accounting adjustment noting how much money was refunded (e.g., including if there was any restocking fees or goods that weren't returned and remain in the customer's hands); and the like. A return may represent a change to the contract of sale (e.g., the order), and where the e-commerce platform 100 may make the merchant aware of compliance issues with respect to legal obligations (e.g., with respect to taxes). In some embodiments, the e-commerce platform 100 may enable merchants to keep track of changes to the contract of sales over time, such as implemented through a sales model component (e.g., an append-only date-based ledger that records sale-related events that happened to an item).

Implementations

The methods and systems described herein may be deployed in part or in whole through a machine that executes computer software, program codes, and/or instructions on a processor. The processor may be part of a server, cloud server, client, network infrastructure, mobile computing platform, stationary computing platform, or other computing platform. A processor may be any kind of computational or processing device capable of executing program instructions, codes, binary instructions and the like. The processor may be or include a signal processor, digital processor, embedded processor, microprocessor or any variant such as a co-processor (math co-processor, graphic co-processor, communication co-processor and the like) and the like that may directly or indirectly facilitate execution of program code or program instructions stored thereon. In addition, the processor may enable execution of multiple programs, threads, and codes. The threads may be executed simultaneously to enhance the performance of the processor and to facilitate simultaneous operations of the application. By way of implementation, methods, program codes, program instructions and the like described herein may be implemented in one or more threads. The thread may spawn other threads that may have assigned priorities associated with them; the processor may execute these threads based on priority or any other order based on instructions provided in the program code. The processor may include memory that stores methods, codes, instructions and programs as described herein and elsewhere. The processor may access a storage medium through an interface that may store methods, codes, and instructions as described herein and elsewhere. The storage medium associated with the processor for storing methods, programs, codes, program instructions or other type of instructions capable of being executed by the computing or processing device may include but may not be limited to one or more of a CD-ROM, DVD, memory, hard disk, flash drive, RAM, ROM, cache and the like.

A processor may include one or more cores that may enhance speed and performance of a multiprocessor. In some embodiments, the process may be a dual core processor, quad core processors, other chip-level multiprocessor and the like that combine two or more independent cores (called a die).

The methods and systems described herein may be deployed in part or in whole through a machine that executes computer software on a server, cloud server, client, firewall, gateway, hub, router, or other such computer and/or networking hardware. The software program may be associated with a server that may include a file server, print server, domain server, internet server, intranet server and other variants such as secondary server, host server, distributed server and the like. The server may include one or more of memories, processors, computer readable media, storage media, ports (physical and virtual), communication devices, and interfaces capable of accessing other servers, clients, machines, and devices through a wired or a wireless medium, and the like. The methods, programs or codes as described herein and elsewhere may be executed by the server. In addition, other devices required for execution of methods as described in this application may be considered as a part of the infrastructure associated with the server.

The server may provide an interface to other devices including, without limitation, clients, other servers, printers, database servers, print servers, file servers, communication servers, distributed servers and the like. Additionally, this coupling and/or connection may facilitate remote execution of programs across the network. The networking of some or all of these devices may facilitate parallel processing of a program or method at one or more locations without deviating from the scope of the disclosure. In addition, any of the devices attached to the server through an interface may include at least one storage medium capable of storing methods, programs, code and/or instructions. A central repository may provide program instructions to be executed on different devices. In this implementation, the remote repository may act as a storage medium for program code, instructions, and programs.

The software program may be associated with a client that may include a file client, print client, domain client, internet client, intranet client and other variants such as secondary client, host client, distributed client and the like. The client may include one or more of memories, processors, computer readable media, storage media, ports (physical and virtual), communication devices, and interfaces capable of accessing other clients, servers, machines, and devices through a wired or a wireless medium, and the like. The methods, programs or codes as described herein and elsewhere may be executed by the client. In addition, other devices required for execution of methods as described in this application may be considered as a part of the infrastructure associated with the client.

The client may provide an interface to other devices including, without limitation, servers, other clients, printers, database servers, print servers, file servers, communication servers, distributed servers and the like. Additionally, this coupling and/or connection may facilitate remote execution of programs across the network. The networking of some or all of these devices may facilitate parallel processing of a program or method at one or more locations without deviating from the scope of the disclosure. In addition, any of the devices attached to the client through an interface may include at least one storage medium capable of storing methods, programs, applications, code and/or instructions. A central repository may provide program instructions to be executed on different devices. In this implementation, the remote repository may act as a storage medium for program code, instructions, and programs.

The methods and systems described herein may be deployed in part or in whole through network infrastructures. The network infrastructure may include elements such as computing devices, servers, routers, hubs, firewalls, clients, personal computers, communication devices, routing devices and other active and passive devices, modules and/or components as known in the art. The computing and/or non-computing device(s) associated with the network infrastructure may include, apart from other components, a storage medium such as flash memory, buffer, stack, RAM, ROM and the like. The processes, methods, program codes, instructions described herein and elsewhere may be executed by one or more of the network infrastructural elements.

The methods, program codes, and instructions described herein and elsewhere may be implemented in different devices which may operate in wired or wireless networks. Examples of wireless networks include 4th Generation (4G) networks (e.g., Long-Term Evolution (LTE)) or 5th Generation (5G) networks, as well as non-cellular networks such as Wireless Local Area Networks (WLANs). However, the principles described therein may equally apply to other types of networks.

The operations, methods, programs codes, and instructions described herein and elsewhere may be implemented on or through mobile devices. The mobile devices may include navigation devices, cell phones, mobile phones, mobile personal digital assistants, laptops, palmtops, netbooks, pagers, electronic books readers, music players and the like. These devices may include, apart from other components, a storage medium such as a flash memory, buffer, RAM, ROM and one or more computing devices. The computing devices associated with mobile devices may be enabled to execute program codes, methods, and instructions stored thereon. Alternatively, the mobile devices may be configured to execute instructions in collaboration with other devices. The mobile devices may communicate with base stations interfaced with servers and configured to execute program codes. The mobile devices may communicate on a peer-to-peer network, mesh network, or other communications network. The program code may be stored on the storage medium associated with the server and executed by a computing device embedded within the server. The base station may include a computing device and a storage medium. The storage device may store program codes and instructions executed by the computing devices associated with the base station.

The computer software, program codes, and/or instructions may be stored and/or accessed on machine readable media that may include: computer components, devices, and recording media that retain digital data used for computing for some interval of time; semiconductor storage known as random access memory (RAM); mass storage typically for more permanent storage, such as optical discs, forms of magnetic storage like hard disks, tapes, drums, cards and other types; processor registers, cache memory, volatile memory, non-volatile memory; optical storage such as CD, DVD; removable media such as flash memory (e.g., USB sticks or keys), floppy disks, magnetic tape, paper tape, punch cards, standalone RAM disks, Zip drives, removable mass storage, off-line, and the like; other computer memory such as dynamic memory, static memory, read/write storage, mutable storage, read only, random access, sequential access, location addressable, file addressable, content addressable, network attached storage, storage area network, bar codes, magnetic ink, and the like.

The methods and systems described herein may transform physical and/or or intangible items from one state to another. The methods and systems described herein may also transform data representing physical and/or intangible items from one state to another, such as from usage data to a normalized usage dataset.

The elements described and depicted herein, including in flow charts and block diagrams throughout the figures, imply logical boundaries between the elements. However, according to software or hardware engineering practices, the depicted elements and the functions thereof may be implemented on machines through computer executable media having a processor capable of executing program instructions stored thereon as a monolithic software structure, as standalone software modules, or as modules that employ external routines, code, services, and so forth, or any combination of these, and all such implementations may be within the scope of the present disclosure. Examples of such machines may include, but may not be limited to, personal digital assistants, laptops, personal computers, mobile phones, other handheld computing devices, medical equipment, wired or wireless communication devices, transducers, chips, calculators, satellites, tablet PCs, electronic books, gadgets, electronic devices, devices having artificial intelligence, computing devices, networking equipment, servers, routers and the like. Furthermore, the elements depicted in the flow chart and block diagrams or any other logical component may be implemented on a machine capable of executing program instructions. Thus, while the foregoing drawings and descriptions set forth functional aspects of the disclosed systems, no particular arrangement of software for implementing these functional aspects should be inferred from these descriptions unless explicitly stated or otherwise clear from the context. Similarly, it will be appreciated that the various steps identified and described above may be varied, and that the order of steps may be adapted to particular applications of the techniques disclosed herein. All such variations and modifications are intended to fall within the scope of this disclosure. As such, the depiction and/or description of an order for various steps should not be understood to require a particular order of execution for those steps, unless required by a particular application, or explicitly stated or otherwise clear from the context.

The methods and/or processes described above, and steps thereof, may be realized in hardware, software or any combination of hardware and software suitable for a particular application. The hardware may include a general-purpose computer and/or dedicated computing device or specific computing device or particular aspect or component of a specific computing device. The processes may be realized in one or more microprocessors, microcontrollers, embedded microcontrollers, programmable digital signal processors or other programmable devices, along with internal and/or external memory. The processes may also, or instead, be embodied in an application specific integrated circuit, a programmable gate array, programmable array logic, or any other device or combination of devices that may be configured to process electronic signals. It will further be appreciated that one or more of the processes may be realized as a computer executable code capable of being executed on a machine-readable medium.

The computer executable code may be created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software, or any other machine capable of executing program instructions.

Thus, in one aspect, each method described above, and combinations thereof may be embodied in computer executable code that, when executing on one or more computing devices, performs the steps thereof. In another aspect, the methods may be embodied in systems that perform the steps thereof and may be distributed across devices in a number of ways, or all of the functionality may be integrated into a dedicated, standalone device or other hardware. In another aspect, the means for performing the steps associated with the processes described above may include any of the hardware and/or software described above. All such permutations and combinations are intended to fall within the scope of the present disclosure.

The invention claimed is:

1. A computer-implemented method, comprising:

receiving, via a computing device, live camera feed data depicting a defined space, the defined space being defined by interior surfaces including at least one wall;

extracting three-dimensional geometric scan data and first texture data for the defined space from the live camera feed data;

detecting an object occluding a first one of the interior surfaces of the defined space based on performing object recognition in video processing of the live camera feed data;

in response to detecting the object:

identifying a corresponding portion of the first interior surface occluded by the detected object based on determining an area of overlap between a three-dimensional bounding box encompassing a position of the detected object and the first interior surface; and estimating texture data for the corresponding portion of the first interior surface based on the first texture data for the defined space, outputting texture data for the interior surfaces based on the first texture data for the defined space and the estimated texture data for the corresponding portion of the first interior surface.

2. The method of claim 1, further comprising outputting a model of the defined space, the model including the texture data for the interior surfaces.

3. The method of claim 2, wherein outputting the model of the defined space comprises presenting, in a display device, display data representing the texture data for the interior surfaces.

4. The method of claim 1, wherein the defined space is an interior space.

5. The method of claim 4, wherein the interior space is a room.

6. The method of claim 1, wherein the live camera feed data comprises at least one of camera data or LiDAR scanner data.

7. The method of claim 1, wherein identifying the corresponding portion of the first interior surface comprises determining a three-dimensional occlusion area associated with the detected object.

8. The method of claim 1, wherein the three-dimensional bounding box is represented using geometrical coordinates associated with boundaries of the three-dimensional bounding box.

9. The method of claim 1, wherein estimating the texture data for the corresponding portion of the first interior surface comprises:

obtaining second texture data for portions of the first interior surface that are not occluded by the detected object; and estimating the texture data for the corresponding portion using an inpainting technique based on the second texture data.

10. The method of claim 9, wherein estimating the texture data for the corresponding portion comprises performing pattern recognition for identifying primary patterns associated with the second texture data.

11. The method of claim 1, wherein detecting the object comprises determining that the object is positioned in spaced relation to the occluded interior surface.

12. The method of claim 1, wherein detecting the object comprises performing object recognition based on the three-dimensional geometric scan data using a trained machine learning model.

13. A computing system, comprising:

a processor; and a memory coupled to the processor, the memory storing computer-executable instructions that, when executed by the processor, configure the processor to:

receive, via a computing device, live camera feed data depicting a defined space, the defined space being defined by interior surfaces including at least one wall;

extract three-dimensional geometric scan data and first texture data for the defined from the live camera feed data;

detect an object occluding a first one of the interior surfaces of the defined space based on performing object recognition in video processing of the live camera feed data;

in response to detecting the object:

identify a corresponding portion of the first interior surface occluded by the detected object based on determining an area of overlap between a three-dimensional bounding box encompassing a position of the detected object and the first interior surface; and estimate texture data for the corresponding portion of the first interior surface based on the first texture data for the defined space, and output texture data for the interior surfaces based on the first texture data for the defined space and the estimated texture data for the corresponding portion of the first interior surface.

14. The computing system of claim 13, wherein the instructions, when executed, further configure the processor to output a model of the defined space, the model including the texture data for the interior surfaces.

15. The computing system of claim 14, wherein outputting the model of the defined space comprises presenting, in a display device, display data representing the texture data for the interior surfaces.

16. The computing system of claim 13, wherein estimating the texture data for the corresponding portion of the first interior surface comprises:

obtaining second texture data for portions of the first interior surface that are not occluded by the detected object; and estimating the texture data for the corresponding portion using an inpainting technique based on the second texture data.

17. A non-transitory, computer-readable medium storing computer-executable instructions that, when executed by a processor, configure the processor to:

receive, via a computing device, live camera feed data depicting a defined space, the defined space being defined by interior surfaces including at least one wall;

extract three-dimensional geometric scan data and first texture data for the defined space from the live camera feed data;

detect an object occluding a first one of the interior surfaces of the defined space based on performing object recognition in video processing of the live camera feed data;

in response to detecting the object:

identify a corresponding portion of the first interior surface occluded by the detected object based on determining an area of overlap between a three-dimensional bounding box encompassing a position of the detected object and the first interior surface; and estimate texture data for the corresponding portion of the first interior surface based on the first texture data for the defined space, and output texture data for the interior surfaces based on the first texture data for the defined space and the estimated texture data for the corresponding portion of the first interior surface.

18. The method of claim 1, further comprising providing, via an augmented reality (AR) device, an AR scene of the defined space with the detected object removed based on combining the live camera feed data and the outputted texture data for the interior surfaces.

19. The method of claim 18, further comprising causing to be displayed, in the AR scene of the defined space, at least one replacement object different from the detected object.

20. The method of claim 18, wherein estimating the texture data for the corresponding portion of the first interior surface comprises using depth information for the AR scene to determine surface texture at a same depth as the first interior surface.

* * * * *